US010524179B2

(12) United States Patent
Anchan et al.

(10) Patent No.: US 10,524,179 B2
(45) Date of Patent: Dec. 31, 2019

(54) RATE ADAPTATION DURING HANDOFFS

(71) Applicant: QUALCOMM Incorporated, San Diego, CA (US)

(72) Inventors: Kirankumar Bhoja Anchan, San Diego, CA (US); Srinivasan Balasubramanian, San Diego, CA (US); Arvind Vardarajan Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 15/092,147

(22) Filed: Apr. 6, 2016

(65) Prior Publication Data

US 2016/0302128 A1    Oct. 13, 2016

Related U.S. Application Data

(60) Provisional application No. 62/145,981, filed on Apr. 10, 2015.

(51) Int. Cl.
*H04W 36/30* (2009.01)
*H04W 72/04* (2009.01)
*H04W 36/00* (2009.01)

(52) U.S. Cl.
CPC ....... *H04W 36/30* (2013.01); *H04W 36/0022* (2013.01); *H04W 72/0406* (2013.01)

(58) Field of Classification Search
CPC combination set(s) only.
See application file for complete search history.

(56) References Cited

U.S. PATENT DOCUMENTS

| 8,416,690 B2 | 4/2013 | Zhao et al. |
| 8,427,949 B2 | 4/2013 | Yang |
| 9,007,914 B2 | 4/2015 | Leung et al. |

(Continued)

FOREIGN PATENT DOCUMENTS

| EP | 1850534 A1 | 10/2007 |
| EP | 2635069 A1 | 9/2013 |

OTHER PUBLICATIONS

Chen et al., "Enhancing QoS Support for Vertical Handoffs Using Implicit/Explicit Handoff Notifications," Second International Conference on Quality of Service in Heterogeneous Wired/Wireless Networks (QSHINE'05), Lake Vista, FL, Aug. 24, 2005, 8 pgs., XP_10859427A, Institute of Electrical and Electronics Engineers.

(Continued)

*Primary Examiner* — Yee F Lam
(74) *Attorney, Agent, or Firm* — Holland & Hart LLP

(57) ABSTRACT

A method, an apparatus, and a computer program product for wireless communication are provided. The apparatus may receive information indicating a potential handoff for another apparatus in communication with the apparatus. The apparatus may adjust, based on the information indicating the potential handoff, a communication parameter or a communication rate associated with the communication before the potential handoff occurs. The apparatus may identify a potential handoff during communication with another apparatus. The apparatus may cause, based on identifying the potential handoff, an adjustment to a communication parameter or a communication rate associated with the communication before the potential handoff occurs.

30 Claims, 16 Drawing Sheets

(56) References Cited

U.S. PATENT DOCUMENTS

| | | | |
|---|---|---|---|
| 2006/0077994 A1* | 4/2006 | Spindola | H04J 3/0632 370/412 |
| 2009/0131058 A1* | 5/2009 | Dupuy | H04W 36/02 455/439 |
| 2009/0285175 A1* | 11/2009 | Nix | H04L 29/125 370/331 |
| 2009/0323632 A1* | 12/2009 | Nix | H04L 29/125 370/331 |
| 2011/0019580 A1 | 1/2011 | Nagasawa et al. | |
| 2011/0205922 A1 | 8/2011 | Yokota | |
| 2013/0170471 A1* | 7/2013 | Nix | H04W 36/00 370/331 |
| 2014/0036667 A1 | 2/2014 | Balasubramanian et al. | |
| 2014/0219122 A1 | 8/2014 | Nakamura et al. | |
| 2015/0146689 A1* | 5/2015 | Fu | H04J 3/0632 370/331 |
| 2015/0189556 A1 | 7/2015 | Sidhu et al. | |
| 2017/0117985 A1* | 4/2017 | Bruhn | H04L 1/0014 |

OTHER PUBLICATIONS

ISA/EP, International Search Report and Written Opinion of the International Searching Authority, Int'l Appl. No. PCT/US2016/026488, dated Jun. 29, 2016, European Patent Office, Rijswijk, NL, 14 pgs.

Shah et al., "On Reducing Throughput Degradation of TCP Connection After Vertical Handover," IEEE 13th International Multitopic Conference, 2009, INMIC 2009, Islamabad, Dec. 14-15, 2009, 4 pgs., ISBN 978-1-4244-4873-9, Institute of Electrical and Electronics Engineers.

IPEA/EP, Second Written Opinion of the International Preliminary Examining Authority, Int'l Application No. PCT/US2016/026488, dated Mar. 3, 2017, European Patent Office, Munich, DE, 11 pgs.

* cited by examiner

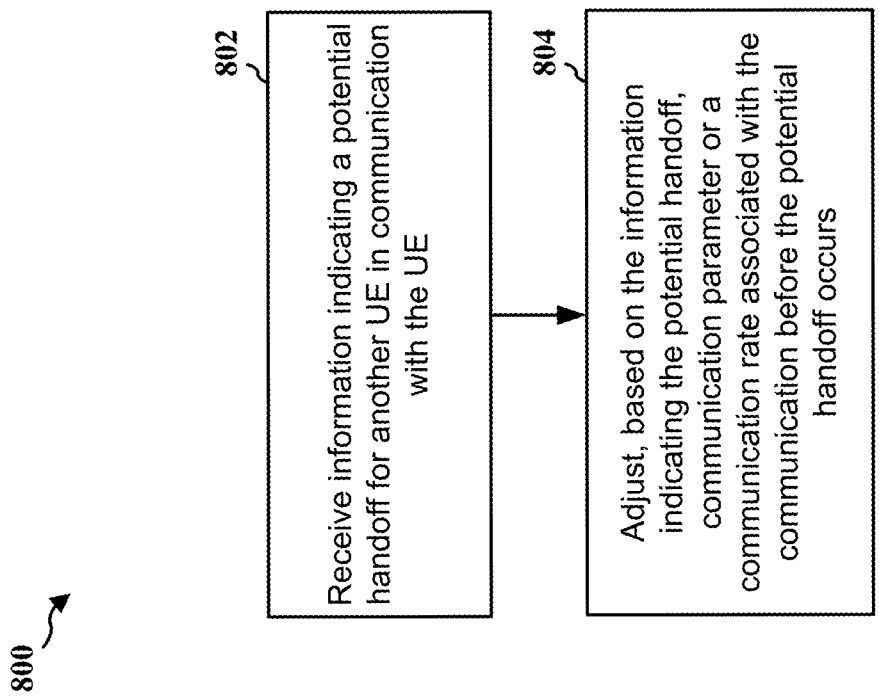

RATE ADAPTATION DURING HANDOFFS

CROSS REFERENCES

The present application for patent claims priority to U.S. Provisional Patent Application No. 62/145,981 by Anchan et al., entitled "Rate Adaptation During Handoffs," filed Apr. 10, 2015, assigned to the assignee hereof.

BACKGROUND

Field of the Disclosure

The present disclosure relates generally to communication systems, and more particularly, to improving rate adaptation reaction time during handoffs.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

A method of wireless communication is described. The method may include receiving, by user equipment (UE), information indicating a potential handoff for another UE in communication with the UE. The method may include adjusting, by the UE and based on the information indicating the potential handoff, a communication parameter or a communication rate associated with the communication before the potential handoff occurs.

An apparatus for wireless communication is described. The apparatus may include a processor, memory in electronic communication with the processor, and instructions stored in the memory. The instructions may be operable to cause the processor to receive information indicating a potential handoff for another device in communication with the device. The instructions may further be operable to cause the processor to adjust, based on the information indicating the potential handoff, a communication parameter or a communication rate associated with the communication before the potential handoff occurs.

A further apparatus is described. The apparatus may include a means for receiving information indicating a potential handoff for another apparatus in communication with the apparatus. The apparatus may include a means for adjusting, based on the information indicating the potential handoff, a communication parameter or a communication rate associated with the communication before the potential handoff occurs.

A non-transitory computer readable medium for wireless communication is described. The non-transitory computer-readable medium may include instructions to cause one or more processors to receive, by a device, information indicating a potential handoff for another device in communication with the device. The instructions cause the one or more processors to adjust, based on the information indicating the potential handoff, a communication parameter or a communication rate associated with the communication before the potential handoff occurs.

Some examples of the method, apparatus, or non-transitory computer-readable medium described above may further include processes, features, means, or instructions for determining an expected value of the communication parameter, the expected value of the communication parameter being expected during the potential handoff and determining that the expected value of the communication parameter is within a threshold of a particular value of the communication parameter. In some examples of the method, apparatus, or non-transitory computer-readable medium described above, adjusting the communication parameter or the communication rate may include determining, based on information stored in a data structure storing handoff information or the communication parameter, particular information associated with at least one of a communication delay or a jitter profile, and adjusting the communication parameter or the communication rate based on the particular information and based on determining that the expected value of the communication parameter is within the threshold of the particular value of the communication parameter.

Some examples of the method, apparatus, or non-transitory computer-readable medium described above may further include processes, features, means, or instructions for utilizing a rate adaptation algorithm to determine an adjustment to the communication rate based on receiving the information indicating the potential handoff, where adjusting the communication rate further comprises adjusting a video telephony encoder rate based on determining the adjustment to the communication rate.

In some examples of the method, apparatus, or non-transitory computer-readable medium described above, the information indicating the potential handoff includes at least one of an estimated communication rate, an audio to video synchronization delay, an encoder buffer size, a decoder buffer size, an expected jitter value to influence a jitter buffer size, a predicted handoff time, a predicted handoff duration, or a predicted handoff type.

In some examples of the method, apparatus, or non-transitory computer-readable medium described above, the communication parameter includes at least one of a jitter buffer size, a communication codec parameter, a codec frame per second rate, or a codec resolution.

Some examples of the method, apparatus, or non-transitory computer-readable medium described above may further include processes, features, means, or instructions for determining an estimated uplink or downlink rate associated with the communication based on the information indicating the potential handoff, and adjusting the communication parameter or the communication rate, after receiving the potential handoff indication, based on the estimated uplink or downlink rate.

Some examples of the method, apparatus, or non-transitory computer-readable medium described above may further include processes, features, means, or instructions for receiving information indicating that the potential handoff is not occurring, and adjusting the communication parameter or the communication rate based on receiving the information indicating that the potential handoff is not occurring.

Some examples of the method, apparatus, or non-transitory computer-readable medium described above may further include processes, features, means, or instructions for receiving information indicating that the potential handoff is completed, adjusting the communication parameter or the communication rate based on receiving the information indicating that the potential handoff is completed, where the information indicating the potential handoff or the information indicating that the potential handoff is completed is received via at least one of a real-time transport protocol (RTP) control protocol (RTCP) message or a generic application layer signaling message.

Some examples of the method, apparatus, or non-transitory computer-readable medium described above may further include processes, features, means, or instructions for receiving information indicating an amount of jitter associated with the communication, wherein the amount of jitter is associated with the other UE undergoing the potential handoff, where the amount of jitter is greater than an amount of jitter associated with the communication prior to the other UE undergoing the potential handoff. Additionally or alternatively, some examples of the method, apparatus, or non-transitory computer-readable medium described above may further include processes, features, means, or instructions for receiving information indicating an amount of packet delay associated with the communication, where the amount of packet delay is associated with the other UE undergoing the potential handoff, and where the amount of packet delay is greater than an amount of packet delay associated with the communication prior to the other UE undergoing the potential handoff, and maintaining the communication rate after receiving the information indicating the amount of jitter or the information indicating the amount of packet delay.

In some examples of the method, apparatus, or non-transitory computer-readable medium described above, the communication is a video communication, and the communication rate is a video telephony rate. In some examples of the method, apparatus, or non-transitory computer-readable medium described above, the potential handoff is a potential inter-radio access technology (inter-RAT) handoff.

Some examples of the method, apparatus, or non-transitory computer-readable medium described above may further include processes, features, means, or instructions for receiving information indicating an estimated time of the potential handoff occurring, where adjusting the communication parameter or the communication rate further comprises adjusting the communication rate before the estimated time based on receiving the information indicating the estimated time of the potential handoff occurring.

A method of wireless communication is described. The method may include identifying, by user equipment (UE), a potential handoff during a communication with another UE. The method may include causing, by the UE and based on identifying the potential handoff, an adjustment to a communication parameter or a communication rate associated with the communication with the other UE before the potential handoff occurs.

An apparatus for wireless communication is described. The apparatus may include a processor, memory in electronic communication with the processor, and instructions stored in the memory. The instructions may be operable to cause the processor to identify a potential handoff during a communication with another device. The instructions may further be operable to cause the processor to cause, based on identifying the potential handoff, an adjustment to a communication rate associated with the communication before the potential handoff occurs.

A further apparatus is described. The apparatus may include a means for identifying a potential handoff during a communication with another apparatus. The apparatus may include a means for causing, based on identifying the potential handoff, an adjustment to a communication rate associated with the communication before the potential handoff occurs.

A non-transitory computer readable medium for wireless communication is described. The non-transitory computer-readable medium may include instructions to cause a processor to identify, by a device, a potential handoff during a communication with another device. The instructions cause the one or more processors to cause, based on identifying the potential handoff, an adjustment to a communication rate associated with the communication before the potential handoff occurs.

Some examples of the method, apparatus, or non-transitory computer-readable medium described above may further include processes, features, means, or instructions for providing, to the other UE, information associated with the potential handoff before the potential handoff. In some examples of the method, apparatus, or non-transitory computer-readable medium described above, providing the information, associated with the potential handoff, further comprises providing the information, associated with the potential handoff, via application layer signaling.

In some examples of the method, apparatus, or non-transitory computer-readable medium described above, the communication rate is an application layer data rate. In some examples of the method, apparatus, or non-transitory computer-readable medium described above, identifying the potential handoff further comprises identifying the potential handoff based on at least one of motion processor information, signal strength information, or radio access technology (RAT) signaling information.

Some examples of the method, apparatus, or non-transitory computer-readable medium described above may further include processes, features, means, or instructions for utilizing a rate adaptation algorithm to determine the adjustment to the communication rate.

In some examples of the method, apparatus, or non-transitory computer-readable medium described above, causing the adjustment to the communication parameter or the communication rate further comprises providing, before the potential handoff occurs, information associated with the potential handoff to the other UE to cause the other UE to adjust the communication parameter or the communication rate associated with the communication, where the information associated with the potential handoff includes at least one of an expected handoff time, an expected handoff duration, an expected handoff completion time, a handoff type, an estimated communication rate, an audio to video synchronization delay, an encoder buffer size, an expected jitter value to influence a jitter buffer size, or a decoder buffer size.

Some examples of the method, apparatus, or non-transitory computer-readable medium described above may further include processes, features, means, or instructions for determining that the potential handoff is completed, determining that the potential handoff is a particular type of a handoff, and providing information associated with resetting the communication parameter or a communication rate algorithm based on determining that the potential handoff is completed and based on the particular type of a handoff.

Some examples of the method, apparatus, or non-transitory computer-readable medium described above may further include processes, features, means, or instructions for determining that the potential handoff is completed and storing information associated with the potential handoff in a data structure after the potential handoff is completed.

In some examples of the method, apparatus, or non-transitory computer-readable medium described above, the information associated with the potential handoff includes at least one of a handoff execution time associated with the potential handoff, a geographic location associated with the potential handoff, or a type associated with the potential handoff. Some examples of the method, apparatus, or non-transitory computer-readable medium described above may further include processes, features, means, or instructions for determining that the potential handoff is completed and adjusting the communication parameter or the communication rate after the potential handoff is completed.

In some examples of the method, apparatus, or non-transitory computer-readable medium described above, adjusting the communication parameter or the communication rate further comprises providing, to the other UE to cause the other UE to adjust the communication parameter or the communication rate after the potential handoff is completed, information identifying at least one of a target radio access technology (RAT) uplink rate estimate or a target RAT downlink rate estimate.

In some examples of the method, apparatus, or non-transitory computer-readable medium described above, adjusting the communication parameter or the communication rate further comprises providing information associated with a target radio access technology (RAT), the target RAT being a RAT associated with facilitating network connectivity of the UE after the potential handoff. Some examples of the method, apparatus, or non-transitory computer-readable medium described above may further include processes, features, means, or instructions for determining that the potential handoff is not occurring and causing another adjustment to the communication parameter or the communication rate based on determining that the potential handoff is not occurring.

In some examples of the method, apparatus, or non-transitory computer-readable medium described above, determining that the potential handoff is not occurring further comprises determining that a threshold period of time associated with the potential handoff has elapsed and determining that the potential handoff is not occurring based on determining that the threshold period of time associated with the potential handoff has elapsed.

In some examples of the method, apparatus, or non-transitory computer-readable medium described above, causing the other adjustment further comprises providing, to the other UE, information indicating that the potential handoff is not occurring. In some examples of the method, apparatus, or non-transitory computer-readable medium described above, identifying the potential handoff further comprises determining a set of input parameters and identifying the potential handoff using a machine learning based prediction algorithm based on the set of input parameters.

BRIEF DESCRIPTION OF THE DRAWINGS

FIG. 8 is a flow chart of a method of wireless communication.

DETAILED DESCRIPTION

Figure 1:
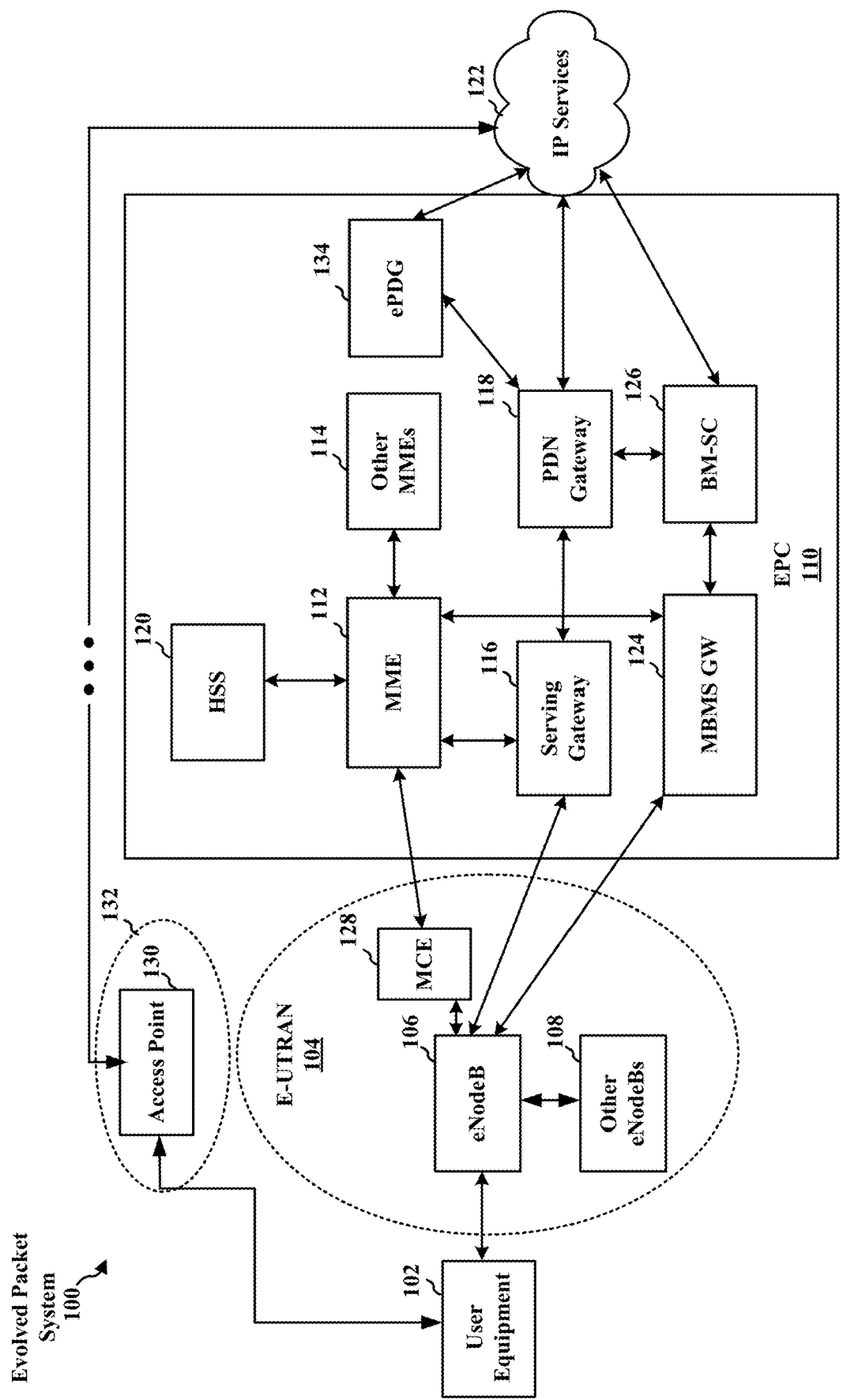
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

First user equipment (UE) and a second UE may be in a communication, such as a video telephony communication, a voice communication, or the like. A communication parameter or communication rate associated with the communication may be determined by the first UE and the second UE utilizing a rate adaptation algorithm, such as a video telephony rate adaptation algorithm. The first UE and/or the second UE may, based on the video telephony rate adaptation algorithm, alter the communication parameter or the communication rate associated with the communication based on detecting a communication delay associated with the communication, a particular jitter profile associated with the communication, or the like.

When the first UE undergoes a handoff or handover (e.g., from a first radio access technology (RAT) to a second RAT), a data interruption may occur. The first UE and the second UE may exchange one or more messages, such as one or more real-time transport protocol (RTP) control protocol (RTCP) sender report (SR) messages, to determine a throughput reduction, a throughput interruption, or the like. When, for example, the second UE receives an RTCP SR message reporting an expected quantity of RTP packets to be received and an actual quantity of RTP packets that are received is less than the expected quantity, the second UE may, in accordance with the rate adaptation algorithm associated with the second UE, adjust the communication parameter or the communication rate to maintain the communication.

However, RTCP messages may be delayed in transmission from the first UE to the second UE, resulting in the second UE not determining that a data rate reduction would be beneficial, as a result of a handoff occurring, until after the handoff is complete. As a consequence, the second UE may fail to reduce the communication rate, in accordance with the rate adaptation algorithm, until after the handoff is complete, resulting in poor performance (e.g., a poor user experience, a video outage, or the like) during the handoff and an unnecessarily reduced communication rate after the handoff (e.g., when the RTCP message packet may be received with delayed RTP packets). A handoff completion delay may cause the packet delivery delay.

Because the first UE and/or the second UE reacts, in accordance with the rate adaptation algorithm, to data rate reduction events resulting from the handoff on an unsatisfactory delay (e.g., as a result of delayed signaling and delayed data delivery), the first UE and/or the second UE can be said to have a poor reaction time. Techniques are described herein that improve a reaction time of the first UE and/or the second UE by identifying a potential handoff and pre-emptively signaling the potential handoff.

Techniques are described in which the first UE may predict a potential handoff (e.g., based on motion sensor information, signal strength information, signaling information with the first RAT, or the like). Based on predicting the potential handoff, the first UE may cause an adjustment to the communication parameter or the communication rate associated with the communication. For example the first UE may pre-emptively (e.g., before the potential handoff occurs or while the handoff is ongoing) transmit an RTCP message or a generic application layer signaling message, as understood by sending and receiving applications, indicating the potential handoff to the second UE causing the second UE to pre-emptively adjust the communication parameter or the communication rate. In this way, rate adaptation reaction time (e.g., a reaction time of the rate adaptation algorithm) is improved, thereby resulting in improved user experience during a handoff, an avoidance of excessively large communication rate changes as a result of failing to properly manage a communication rate during a handoff, and improved delay tolerance by the second UE during the handoff.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, an Operator's Internet Protocol (IP) Services 122, and a wireless local area network (WLAN) access point 130. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMES 114, a Serving Gateway 116, a Multimedia Broadcast Multicast Service (MBMS) Gateway 124, a Broadcast Multicast Service Center (BM-SC) 126, a Packet Data Network (PDN) Gateway 118, and an evolved PDN gateway (ePDG) 134. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

The ePDG 134 may connect to the PDN Gateway 118 and serve to create an IP security (IPsec) tunnel to the UE 102 when utilizing an untrusted wireless local area network (WLAN) access connection (e.g., a Wi-Fi connection). Integration of a Wi-Fi access connection into the EPC 110 facilitates mobile services (e.g., IMS-based voice and video calling, multimedia messaging service (MMS), short message service (SMS), or the like) being available to the UE 102 when the UE 102 is utilizing the WLAN access connection. The WLAN (e.g., Wi-Fi) access may include trusted Wi-Fi access (e.g., where the UE 102 may connect directly to the PDN Gateway 118 via an S2a interface using general packet radio service (GPRS) tunneling protocol (GTP)), an untrusted Wi-Fi access (e.g., where the UE 102 may connect via the IPsec tunnel established between the ePDG 134 using an SWn interface and with the ePDG 134 forwarding network traffic to the PDN Gateway 118 via an S2b interface using GTP).

The UE 102 may connect to a particular radio access technology (RAT) via a corresponding access point. For example, with regard to E-UTRAN 104, UE 102 may connect to the eNodeB 106 providing an LTE RAT. Similarly, the UE 102 may connect to the access point 130 providing a non-LTE RAT 132. In some aspects, the access point 130 may connect to IP services 122. In some aspects, the access point 130 may connect to one or more other devices, such as one or more devices of EPC 110, E-UTRAN 104, or the like. Non-LTE RAT 132 may be a UMTS based RAT, a wireless local area network (WLAN) based RAT (e.g., a Wi-Fi based RAT), an intelligent WLAN (IWLAN) based RAT, a CDMA based RAT, or the like. In some aspects, when performing an inter-RAT handoff, the UE 102 may switch from a first RAT, such as an LTE RAT provided by the eNodeB 106, to a second RAT, such as a Non-LTE RAT provided by access point 130. In some aspects, when performing an intra-RAT handoff, the UE 102 may switch from a first RAT, such as a first LTE RAT provided by eNodeB 106, to a second RAT, such as a second LTE RAT provided by one of the other eNodeBs 108. As disclosed in further detail below, a potential handoff may occur when the UE 102 is in communication with another UE 102, such as during a video telephony communication, a voice communication, or the like. According to some aspects disclosed herein, the UE 102 may adjust a communication parameter or a communication rate (e.g., a video telephony rate) associated with the communication before the potential handoff occurs. In some cases, the adjustment may occur while the handoff is ongoing. In some aspects, the UE 102 may transmit an indicator of the potential handoff to cause the other UE 102 to adjust another communication parameter or communication rate before the potential handoff occurs. After the potential handoff is completed, the UE 102 may adjust the communication parameter or the communication rate and/or cause the other UE 102 to adjust the other communication parameter or communication rate.

Figure 2:
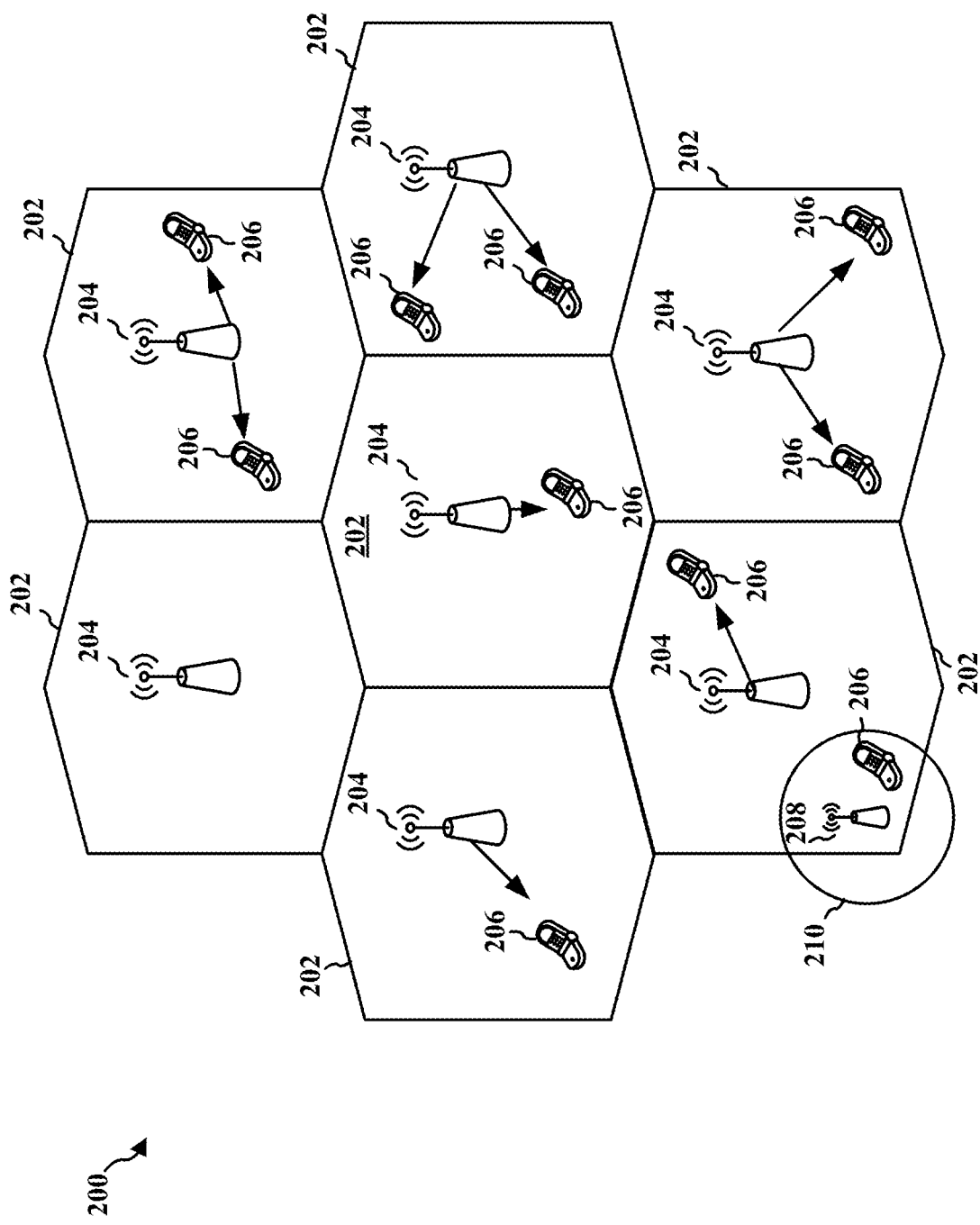
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. UEs 206 may undergo handoffs from a first eNB 208 to a second eNB 208, from the first eNB 208 to a macro eNB 204, from the macro eNB 204 or the eNB 208 to an access point (e.g., the access point 130 of FIG. 1, etc.), or the like.

During these handoffs, a particular one of the UEs 206 may be in communication with one or more other UEs 206 and, in accordance with aspects disclosed herein, preemptively adjust a communication parameter or a communication rate associated with the communication to improve communication quality and decrease packet loss and delays during and after the handoff. Predictive techniques as disclosed herein may be used to identify potential handoffs, allowing the UE 206 to adjust a communication rate before the potential handoff occurs. In some cases, the adjustment may occur while the handoff is ongoing. The UE 206 may also send an indication of the potential handoff to another UE 206 in communication with the UE 206, allowing the other UE 206 to make corresponding adjustments in the communication parameter or communication rate. Further adjustments in the communication parameter or communication rate may be made after the handoff is completed.

There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
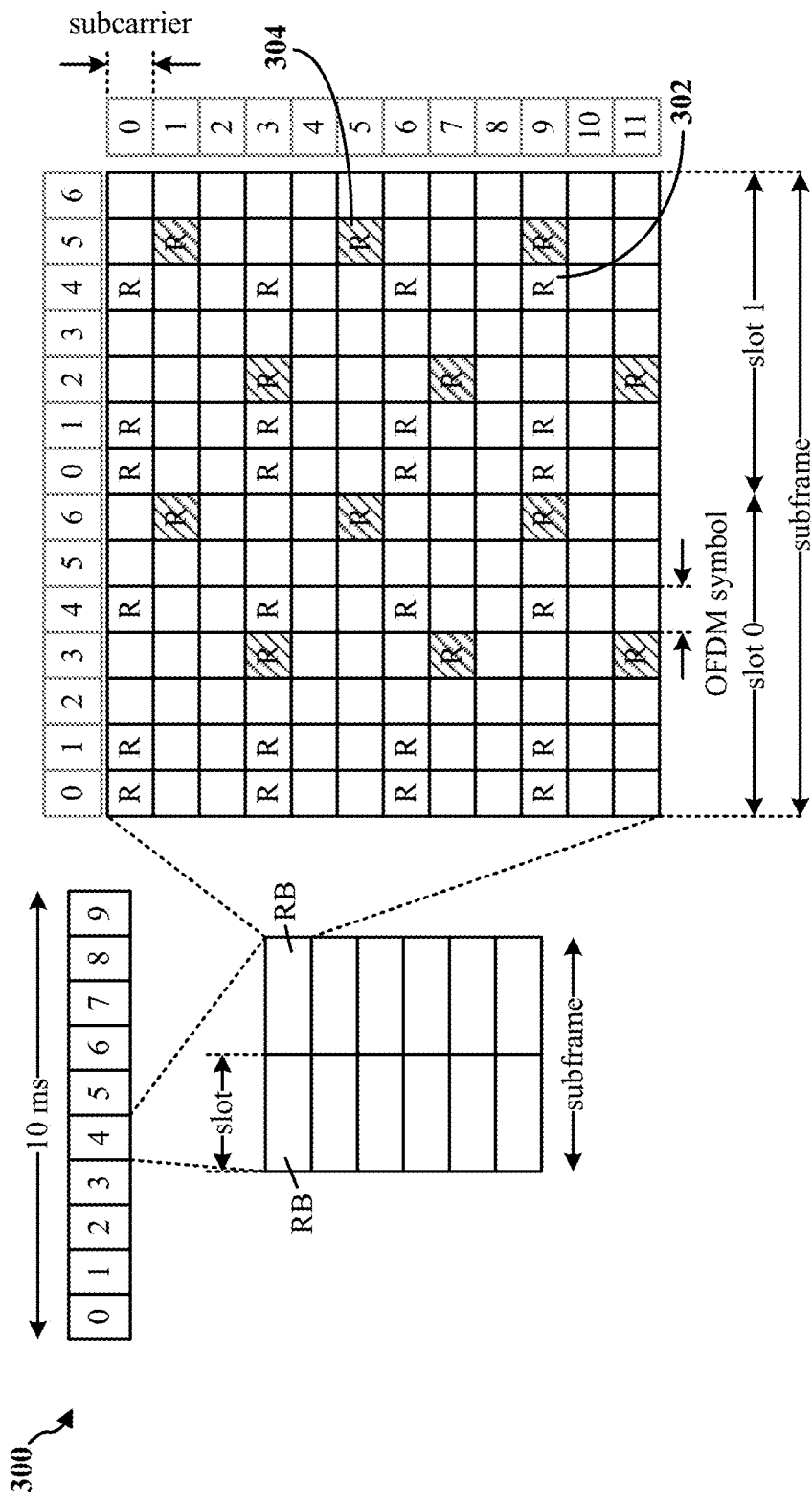
FIG. 3 is a diagram illustrating an example of a downlink (DL) frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

According to some aspects disclosed herein, a UE, such as UE 206 in FIG. 2, may process information associated with a DL LTE frame to predict a potential handoff. For example, the UE may identify a signal strength associated with the DL LTE frame, a set of signals included in the DL LTE frame, or the like associated with indicating a potential handoff. In some aspects, another UE may receive information identifying a potential handoff (e.g., from the UE) via another DL LTE frame.

Figure 4:
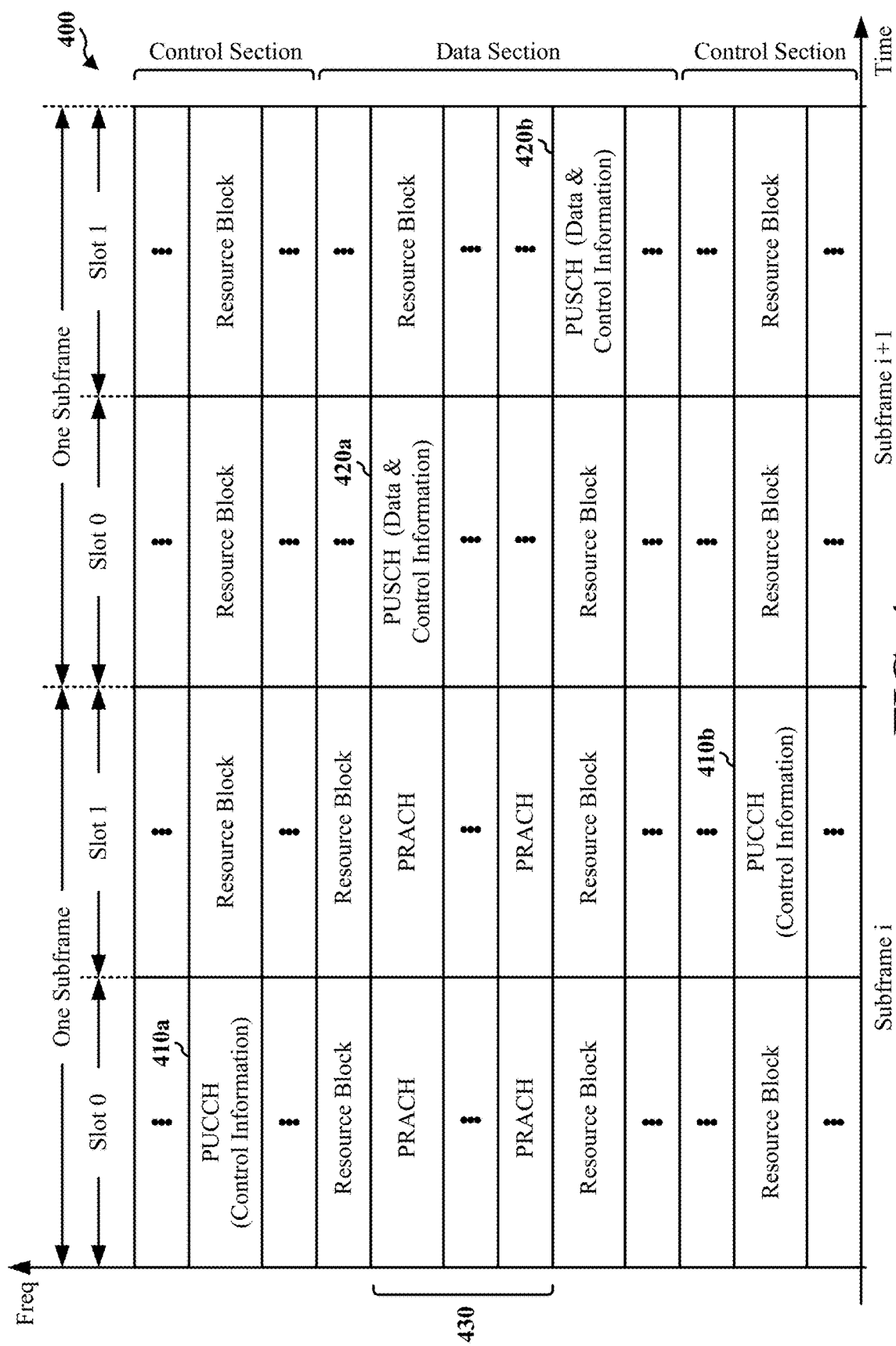
FIG. 4 is a diagram illustrating an example of an uplink (UL) frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

According to some aspects disclosed herein, the UE may utilize a portion of the UL LTE frame to provide information to another UE that a potential handoff is imminent. For example, the UE may provide an indication of the potential handoff and/or information regarding the potential handoff (e.g., a handoff type, a handoff duration, etc.). In some aspects, the UE may utilize a portion of the UL LTE frame to transmit information after a potential handoff is completed and/or is determined to not be occurring to cause an alteration to a communication parameter or a communication rate. In some examples, the communication parameter may be a jitter buffer size, a communication codec parameter, a codec frame per second rate, or a codec resolution.

A set of resource blocks may be used to perform initial system access and achieve UL synchronization in a physical random access channel (PRACH) 430. The PRACH 430 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. In some aspects, there is no frequency hopping for the PRACH. The PRACH attempt is carried in a single subframe (1 ms) or in a sequence of few contiguous subframes and a UE can make a single PRACH attempt per frame (10 ms).

Figure 5:
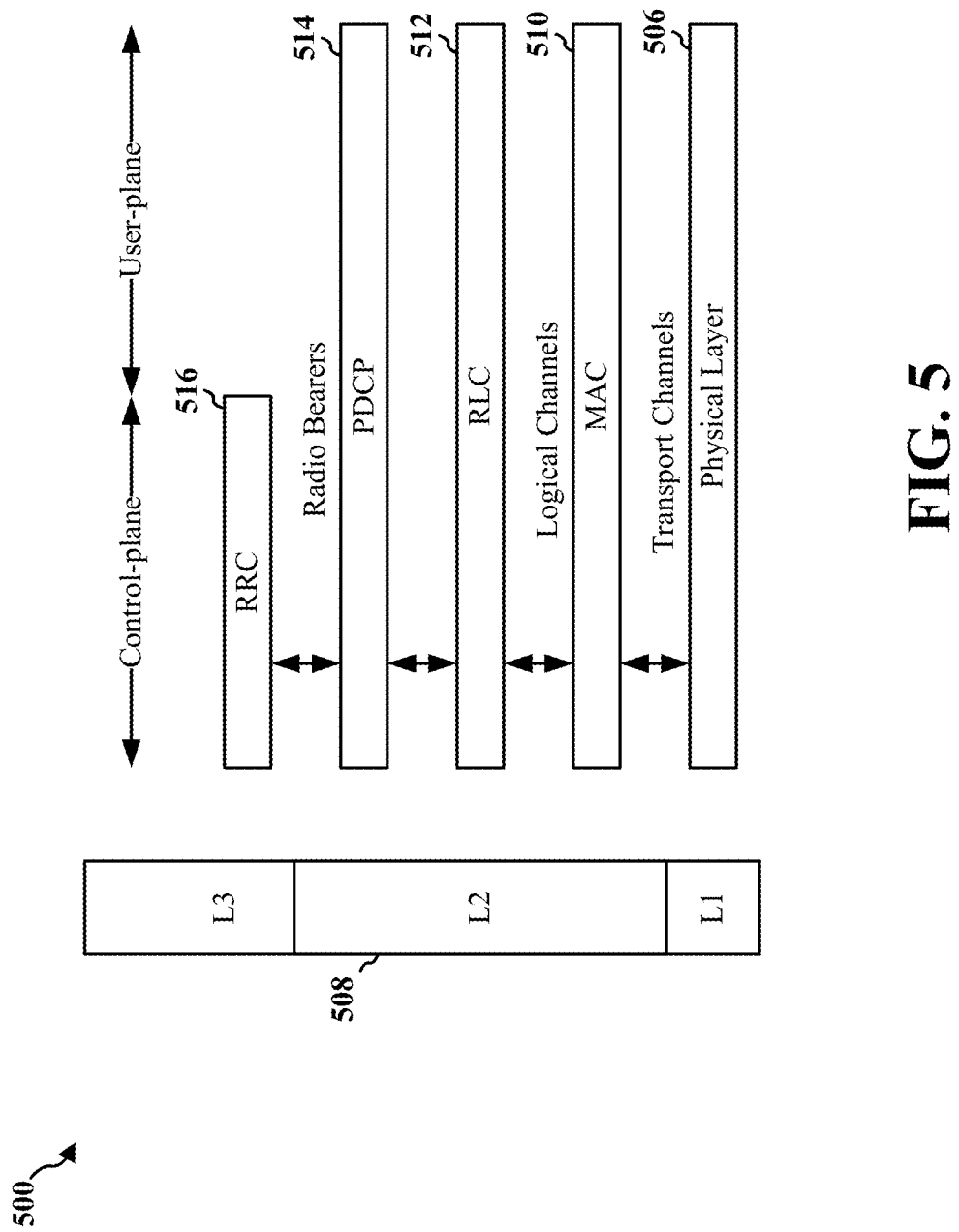
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506. In some aspects, the UE may identify a potential handoff based on information associated with the L1, L2, and/or L3 layers, such as signaling information, communication rate information, or the like.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
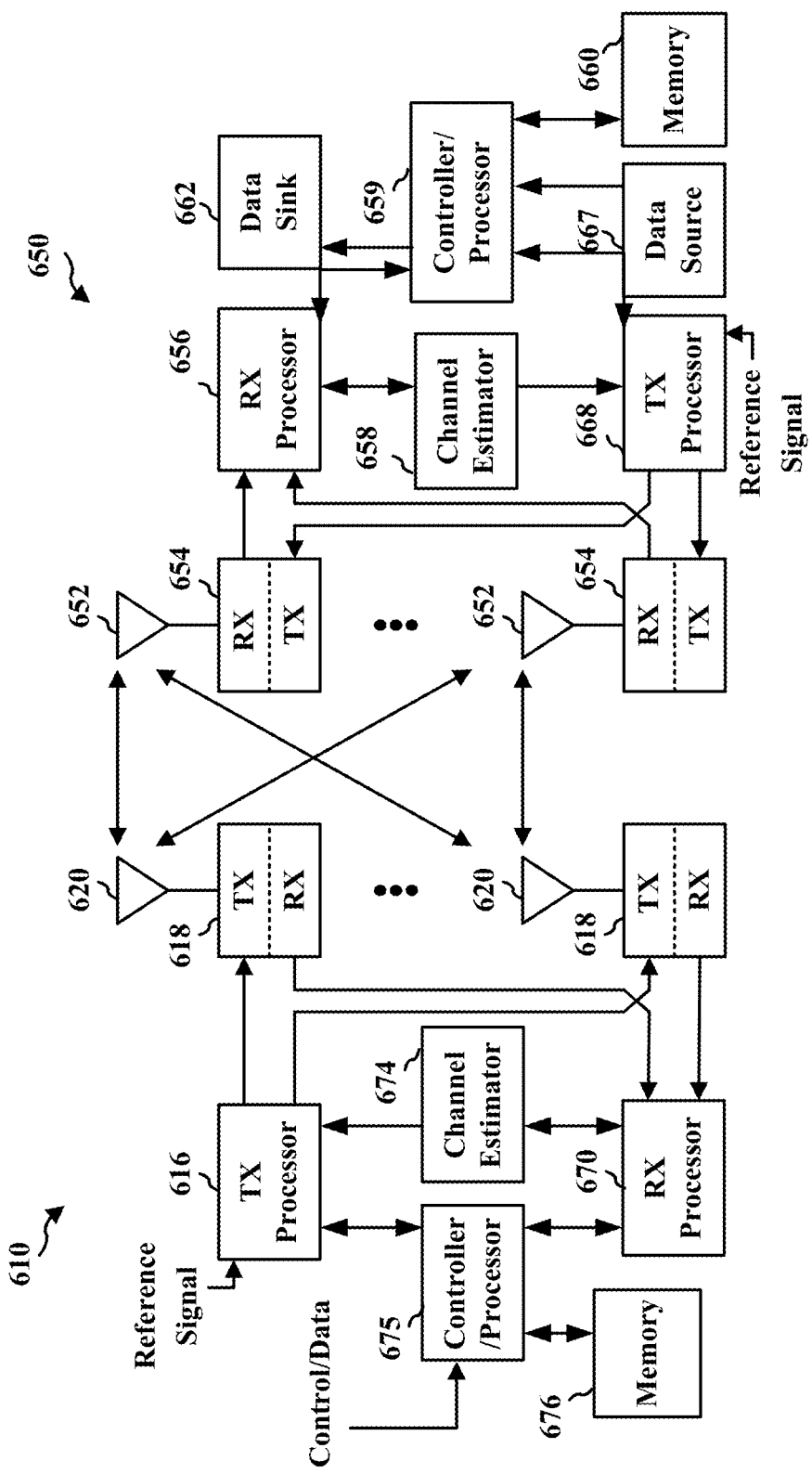
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. For example, a receiver 654RX may recover information signaling a handover, information signaling an adjustment to a communication parameter or a communication rate associated with a handover, or the like. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. For example, packets associated with signaling a handover, signaling an adjustment of a communication parameter or a communication rate related to a handover, or the like may be provided for transmission. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7A:
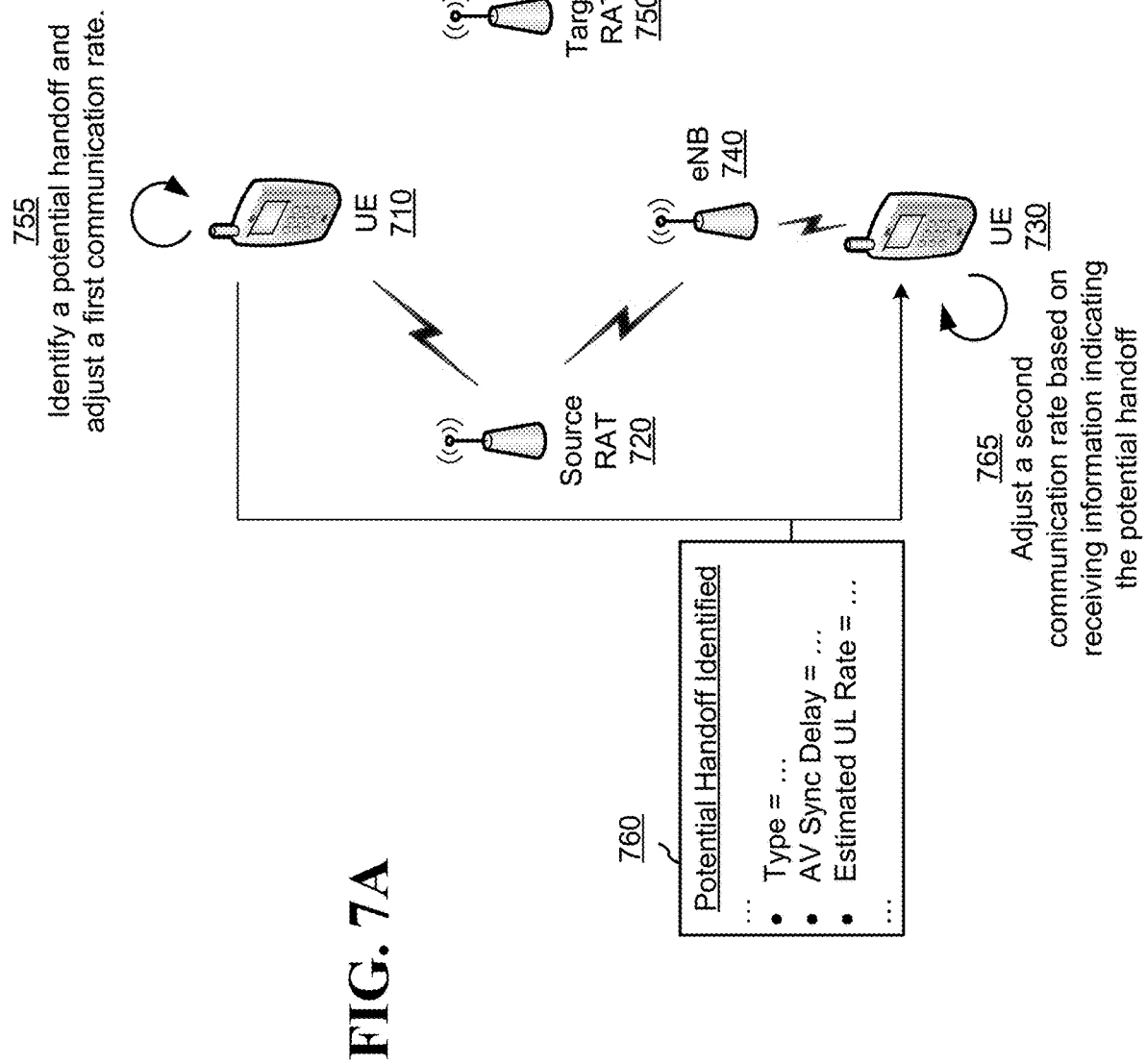
FIGS. 7A and 7B are diagrams illustrating an example of pre-emptively reacting to a potential handoff.
Figure 7B:
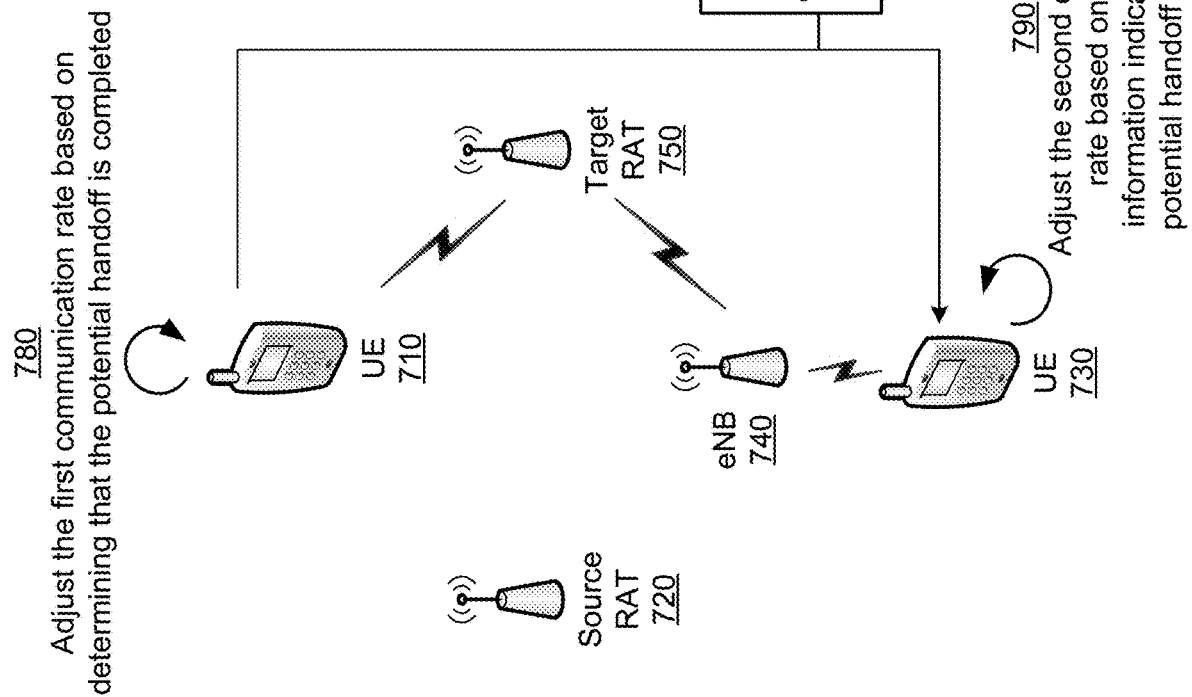

FIGS. 7A and 7B are diagrams illustrating an example 700 of pre-emptively reacting to a potential handoff. As shown in FIG. 7A, example 700 may include a UE 710 (e.g., which may include one or more UE 102 of FIG. 1, the UE 206 of FIG. 2, the UE 650 of FIG. 6, etc.), a source RAT 720 (e.g., which may include one or more of the eNBs 106, 108 of FIG. 1, the eNBs 204, 208 of FIG. 2, the eNB 610 of FIG. 6, etc.), a UE 730 (e.g., which may include one or more UE 102 of FIG. 1, the UE 206 of FIG. 2, the UE 650 of FIG. 6, etc.), an eNB 740 (e.g., which may include one or more of the eNBs 106, 108 of FIG. 1, the eNBs 204, 208 of FIG. 2, the eNB 610 of FIG. 6, etc.), and a target RAT 750 (e.g., which may include one or more of the eNBs 106, 108 of FIG. 1, the eNBs 204, 208 of FIG. 2, the eNB 610 of FIG. 6, etc.).

As shown in FIG. 7A, UE 710 and UE 730 may be connected in a communication (e.g., a video telephony communication via source RAT 720 and eNB 740). As shown by reference number 755, UE 710 may identify a potential handoff (e.g., from source RAT 720 to target RAT 750) during the communication. UE 710 may identify the potential handoff based on motion processor information (e.g., based on determining that UE 710 is being moved away from source RAT 720 and/or toward target RAT 750), based on signal strength information (e.g., based on a signal strength of source RAT 720 failing to satisfy a first threshold and/or based on a signal strength of target RAT 750 satisfying a second threshold), based on signaling information (e.g., based on receiving a particular signal from source RAT 720 and/or target RAT 750 indicating a potential handoff), or the like. Based on identifying the potential handoff, UE 710 may cause an adjustment to a first communication parameter or a first communication rate. For example, UE 710 may utilize a rate adaptation algorithm to adjust an uplink communication rate associated with the communication with UE 730. In this way, UE 710 may pre-emptively adjust the communication rate of the communication, which may result in a lesser degradation of performance during the handoff as compared with another communication for which the communication rate is not pre-emptively adjusted. In some examples, the communication parameter may be a jitter buffer size, a communication codec parameter, a codec frame per second rate, or a codec resolution.

As further shown in FIG. 7A, UE 710 may transmit message 760 (e.g., a real-time transport protocol (RTP) control protocol (RTCP) message) indicating the potential handoff to UE 730 (e.g., via source RAT 720 and eNB 740), a generic application layer signaling message understood by a sending application (e.g., associated with UE 710) and a receiving application (e.g., associated with UE 730), or the like. Message 760 may include information identifying a type of the potential handoff (e.g., an inter-eNB handoff, an inter-RAT handoff, an LTE to Wi-Fi handoff, or the like), an audio-video synchronization delay parameter, an estimated uplink rate parameter, or the like. As shown by reference number 765, based on message 760, UE 730 may adjust a second communication parameter or a second communication rate. For example, UE 730 may utilize a rate adaptation algorithm to adjust a downlink communication rate associated with the communication with UE 710. In this way, UE 730 may pre-emptively adjust the communication rate of the communication, which may result in a lesser degradation of performance during the handoff as compared with another communication for which the communication rate is not pre-emptively adjusted.

As shown in FIG. 7B, UE 710 may complete the potential handoff and connect to target RAT 750 (e.g., target RAT 750 facilitates network connectivity for UE 710). UE 710 may continue the communication with UE 730 (e.g., via target RAT 750 and eNB 740). As shown by reference number 780, based on determining that the potential handoff is completed, UE 710 may cause another adjustment to the first communication parameter or the first communication rate, such as by adjusting the uplink communication rate associated with the communication. UE 710 may transmit message 785 (e.g., another RTCP message) indicating that the potential handoff is completed (e.g., via target RAT 750 and eNB 740), a generic application layer signaling message understood by a sending application (e.g., associated with UE 710) and a receiving application (e.g., associated with UE 730), or the like. Message 785 may include information identifying an estimated uplink rate parameter after the potential handoff is completed, or the like. As shown by reference number 790, based on receiving message 785, UE 730 may adjust the second communication parameter or the second communication rate. For example, UE 730 may adjust the second communication rate based on the estimated uplink rate parameter. In this way, UE 730 may return to a communication rate that is utilized when a handoff is not occurring, thereby improving user experience. In some examples, the communication parameter may be a jitter buffer size, a communication codec parameter, a codec frame per second rate, or a codec resolution.

As indicated above, FIGS. 7A and 7B are provided as an example. Other examples are possible and may differ from what was described in connection with FIGS. 7A and 7B.

FIG. 8 is a flow chart of a method 800 of wireless communication. The method 800 may be performed by a UE (e.g., which may include one or more UE 102 of FIG. 1, the UE 206 of FIG. 2, the UE 650 of FIG. 6, the UEs 710, 730 of FIGS. 7A and/or 7B, the apparatus 1402 of FIG. 14, the apparatus 1402' of FIG. 15, etc.).

At 802, the UE may receive information indicating a potential handoff for another UE in communication with the UE. For example, as described in connection with FIGS. 7A and 7B, the UE 730 may receive the information indicating the potential handoff for UE 710. In some aspects, the information indicating the potential handoff may include information associated with a communication delay, a jitter profile, a type of the potential handoff, an estimated communication rate during the potential handoff, an audio to video synchronization delay associated with the potential handoff, an encoder buffer size, a decoder buffer size, an expected jitter value to influence a jitter buffer size, a predicted handoff time, a predicted handoff duration, a predicted handoff type, or the like. For example, UE 730 may receive the information via message 760 (e.g., an RTCP message, an application layer specific message, or the like). In some aspects, the RTCP message may include a non-standard RTCP application-defined RTCP packet (RTCP APP) message. For example, the RTCP message may include information associated with the potential handoff. In another example, a generic application layer signaling message, as understood by a sending application and a receiving application, may be based on a binary signaling module that statically defines a mapping of one or more fields and one or more corresponding values associated with the one or more fields (similar to other application layer signaling protocols). In some aspects, the handoff type may indicate an inter-RAT handoff, an intra-RAT handoff, or the like. For example, UE 730 may receive the message 760 and may determine that UE 710 is undergoing a Wi-Fi to Wi-Fi handoff, a Wi-Fi to LTE handoff, or the like.

At 804, the UE may adjust, based on the information indicating the potential handoff, communication parameter or a communication rate associated with the communication before the potential handoff occurs. For example, as described in connection with FIGS. 7A and 7B, UE 730 may adjust the communication rate associated with the communication before the potential handoff occurs. In some cases, the adjustment may occur while the handoff is ongoing. In some aspects, UE 730 may adjust the communication rate based on the information received from UE 710 (e.g., via message 760). For example, UE 730 may receive particular information indicating a particular jitter profile for the communication, and UE 730 may adjust the communication rate based on the particular jitter profile. In another example, UE 730 may obtain information, such as information identifying the jitter profile, a communication delay, or the like, from a data structure storing handoff information. In this case, UE 730 may adjust the communication rate based on the information obtained from the data structure. In some aspects, UE 730 may determine, based on the information indicating the potential handoff in message 760, an expected time for the potential handoff. In this case, UE 730 may adjust the communication rate before the expected time for the potential handoff. In some examples, the communication parameter may include a jitter buffer size, a communication codec parameter, a codec frame per second rate, or a codec resolution.

In some aspects, UE 730 may adjust the communication parameter or the communication rate based on information included in the information indicating the potential handoff. For example, UE 730 may determine an audio to video synchronization delay based on information received from UE 710, and may adjust the communication parameter or the communication rate based on the audio to video synchronization delay. In another example, UE 730 may determine an estimated uplink or downlink rate associated with the communication based on the information received from UE 710, and may adjust the communication parameter or the communication rate based on the estimated uplink or downlink rate. In this case, UE 730 may adjust the communication parameter or the communication rate before the potential handoff, during the potential handoff, after the potential handoff, or the like based on the estimated uplink or downlink rate. For example, UE 730 may adjust the communication parameter or the communication rate after receiving the potential handoff indication.

In some aspects, UE 730 may adjust the communication parameter or the communication rate using a rate adaptation algorithm. For example, UE 730 may utilize a rate adaptation algorithm with one or more parameters included in message 760 as inputs to the rate adaptation algorithm, and may determine an adjustment to the communication parameter or the communication rate. In this case, UE 730 may adjust the communication parameter or the communication rate based on determining the adjustment to the communication parameter or the communication rate.

In some aspects, UE 730 may determine an expected value of a parameter associated with the communication parameter or the communication rate during the potential handoff (e.g., based on the information indicating the potential handoff). For example, UE 730 may determine a handoff duration associated with the potential handoff based on information identifying a handoff type for the potential handoff. In this case, UE 730 may adjust the communication parameter or the communication rate for a particular duration of time based on determining the handoff duration, may disregard an increased communication delay as an input to a rate adaptation algorithm during the particular duration of time (e.g., to avoid overcompensating for the handoff), or the like.

In some aspects, UE 730 may determine that the expected value of the parameter is within a threshold of a particular value of the parameter. For example, UE 730 may determine that an expected delay, an expected jitter, or the like is within a threshold of a current delay, a current jitter, or the like. In this case, UE 730 may maintain a communication rate, even when a rate adaptation algorithm, with delay, jitter, or the like as inputs, dictates an adjustment to the communication rate. In another example, when the expected delay, expected jitter, or the like is not within the threshold, UE 730 may adjust the communication rate (e.g., such as by adjusting a video telephony encoder rate).

In some aspects, when adjusting the communication rate, UE 730 may adjust a communication parameter. For example, UE 730 may adjust a video telephony encoder rate when adjusting the communication rate. In another example, UE 730 may adjust an uplink communication rate, a downlink communication rate, or the like.

In some aspects, UE 730 may maintain the communication rate. For example, after adjusting the communication rate based on receiving the indication of the potential handoff, UE 730 may receive information indicating an amount of jitter, a packet delay, or the like that is associated with triggering a rate adaptation algorithm to cause the communication rate to be adjusted (e.g., an increased jitter relative to prior to the potential handoff, an increased packet delay relative to prior to the potential handoff, or the like). In this case, UE 730 may reject an alteration to the communication rate, and may maintain the communication rate, based on pre-emptively adjusting the communication rate and based on receiving the identification of the potential handoff from UE 710.

In some aspects, UE 730 may determine a delay characteristic when adjusting the communication rate. For example UE 730 may utilize a data structure (e.g., a table) storing delay characteristics for handoff types, and may determine a delay characteristic for a particular handoff type of the potential handoff. In this case, UE 730 may, for example, reduce an encoder rate, hold an encoder rate, or the like. In another example, UE 730 may adjust a receiver module, associated with a rate adaptation algorithm, to ignore delay/jitter during an handoff interval determined based on the delay characteristic, ignore an image loss indication notification, or the like. When UE 730 receives an indication that the potential handoff is complete, UE 730 may adjust the communication parameter or the communication rate, as discussed in detail herein in connection with FIG. 9. When UE 730 receives a cancellation and/or times out the potential handoff, UE 730 may adjust the communication rate, as discussed in detail herein in connection with FIG. 10. In each case, UE 730 may provide a notification to UE 710 when a steady state is reached after a potential handoff period.

Although FIG. 8 shows example blocks of a method of wireless communication, in some aspects, the method may include additional blocks, fewer blocks, different blocks, or differently arranged blocks than those shown in FIG. 8. Additionally, or alternatively, two or more blocks shown in FIG. 8 may be performed in parallel.

Figure 9:
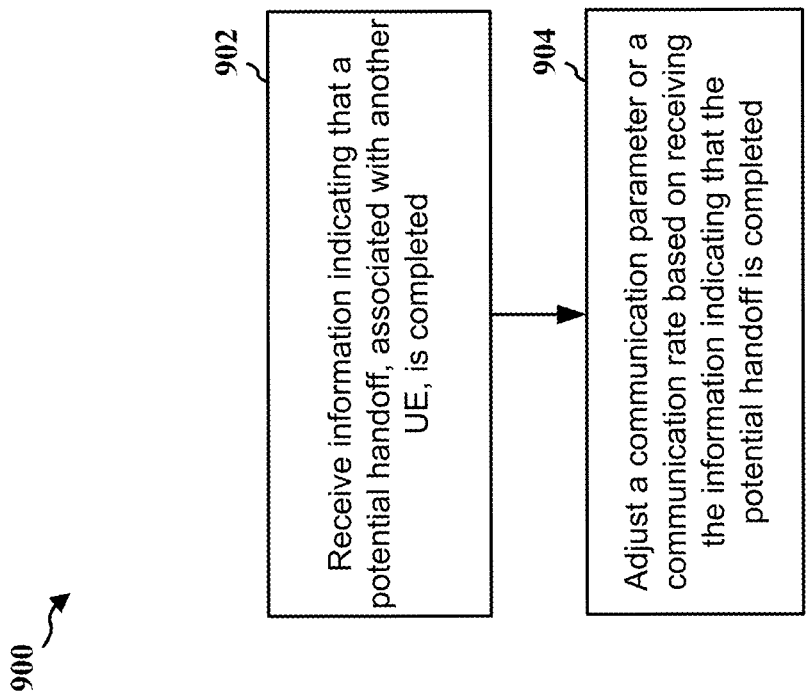
FIG. 9 is a flow chart of a method of wireless communication.

FIG. 9 is a flow chart of a method 900 of wireless communication. The method 900 may be performed by a UE (e.g., which may include one or more UE 102 of FIG. 1, the UE 206 of FIG. 2, the UE 650 of FIG. 6, the UEs 710, 730 of FIGS. 7A and/or 7B, the apparatus 1402 of FIG. 14, the apparatus 1402' of FIG. 15, etc.).

At 902, the UE may receive information indicating that a potential handoff, associated with another UE, is completed. For example, as described above in connection with FIGS. 7A and 7B and FIG. 8, after receiving information indicating a potential handoff and adjusting a communication parameter or a communication rate based on the information indicating the potential handoff, UE 730 may receive information indicating that the potential handoff is completed from UE 710. In some aspects, the UE may receive the information indicating the potential handoff via an RTCP message, a generic application layer signaling message that may be understood by a sending application and a receiving application, or the like. For example, UE 730 may receive, via message 785, a confirmation that the potential handoff is completed. In some aspects, the UE may receive one or more parameters associated with the communication parameter or the communication rate when receiving the information indicating that the potential handoff is completed. For example, UE 730 may receive a parameter for an estimated uplink communication rate (e.g., based on which UE 730 may adjust the communication rate).

At 904, the UE may adjust a communication parameter or a communication rate based on receiving the information indicating that the potential handoff is completed. For example, as described above in connection with FIGS. 7A and 7B and FIG. 8, UE 730 may adjust the communication parameter or the communication rate based on receiving the information indicating that the potential handoff is completed (e.g., message 785). In some aspects, the UE may adjust the communication parameter or the communication rate based on information received from the other UE (e.g., parameters associated with the communication rate). For example, UE 730 may utilize one or more parameters provided by UE 710, such as an estimated uplink data rate, to adjust the communication rate. In another example, UE 730 may adjust the communication parameter or the communication rate based on stored information regarding a communication rate before the potential handoff, or the like. In another example, UE 730 may adjust the communication parameter or the communication rate based on correlating the type of target RAT 750 with a look-up table storing communication rates for different types of target RATs. In some examples, the communication parameter may be a jitter buffer size, a communication codec parameter, a codec frame per second rate, or a codec resolution.

Although FIG. 9 shows example blocks of a method of wireless communication, in some aspects, the method may include additional blocks, fewer blocks, different blocks, or differently arranged blocks than those shown in FIG. 9. Additionally, or alternatively, two or more blocks shown in FIG. 9 may be performed in parallel.

Figure 10:
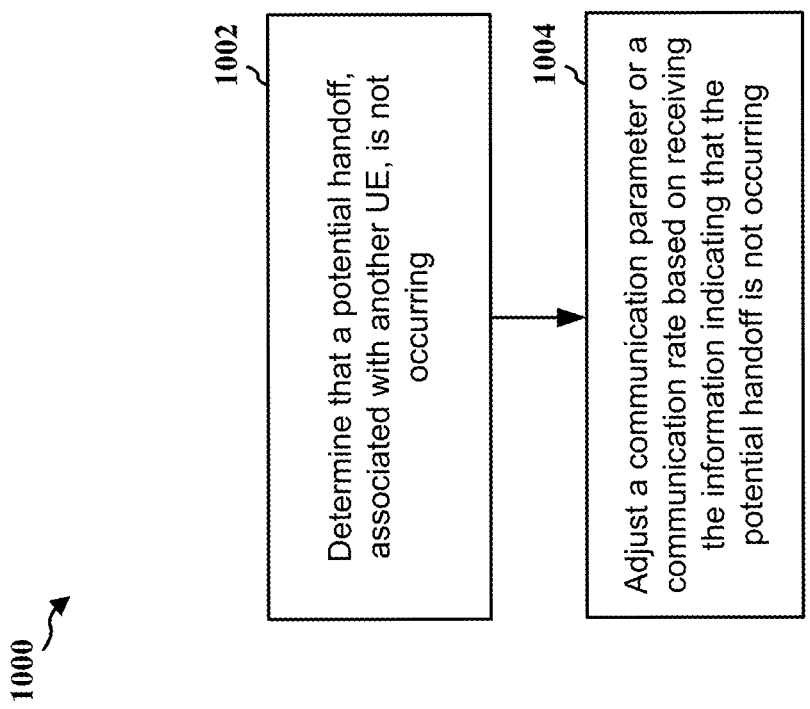
FIG. 10 is a flow chart of a method of wireless communication.

FIG. 10 is a flow chart of a method 1000 of wireless communication. The method 1000 may be performed by a UE (e.g., which may include one or more UE 102 of FIG. 1, the UE 206 of FIG. 2, the UE 650 of FIG. 6, the UEs 710, 730 of FIGS. 7A and/or 7B, etc., the apparatus 1402 of FIG. 14, the apparatus 1402' of FIG. 15, etc.).

At 1002, the UE may determine that a potential handoff, associated with another UE, is not occurring. For example, as described above in connection with FIGS. 7A and 7B and FIG. 8, after receiving information indicating a potential handoff and adjusting a communication parameter or a communication rate based on the information indicating the potential handoff, UE 730 may receive information indicating that the potential handoff is not occurring from UE 710.

In some aspects, the UE may receive the information indicating that the potential handoff is not occurring via an RTCP message, a generic application layer signaling message understood by a sending application and a receiving application, or the like. For example, UE 730 may receive the RTCP message from UE 710 indicating that the potential handoff is not occurring.

In some aspects, the UE may determine that the potential handoff is not occurring without receiving an indication from the other UE. For example, UE 730 may determine that the handoff is not occurring by determining that a threshold period of time has elapsed since UE 730 received the information indicating the potential handoff from UE 710. In some aspects, the UE may determine that the potential handoff is not occurring based on receiving an indication from another device. For example, UE 730 may receive an indication from another eNB (e.g., eNB 740), a network device, or the like.

At 1004, the UE may adjust a communication parameter or a communication rate based on receiving the information indicating that the potential handoff is not occurring. For example, UE 730 may adjust the communication parameter or the communication rate based on receiving the information indicating that the potential handoff is not occurring. In some aspects, UE 730 may adjust the communication parameter or the communication rate based on one or more parameters received from UE 710, based on one or more measured parameters (e.g., a measured jitter, a measured packet delay, etc.), based on a rate adaptation algorithm, or the like.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

Figure 11:
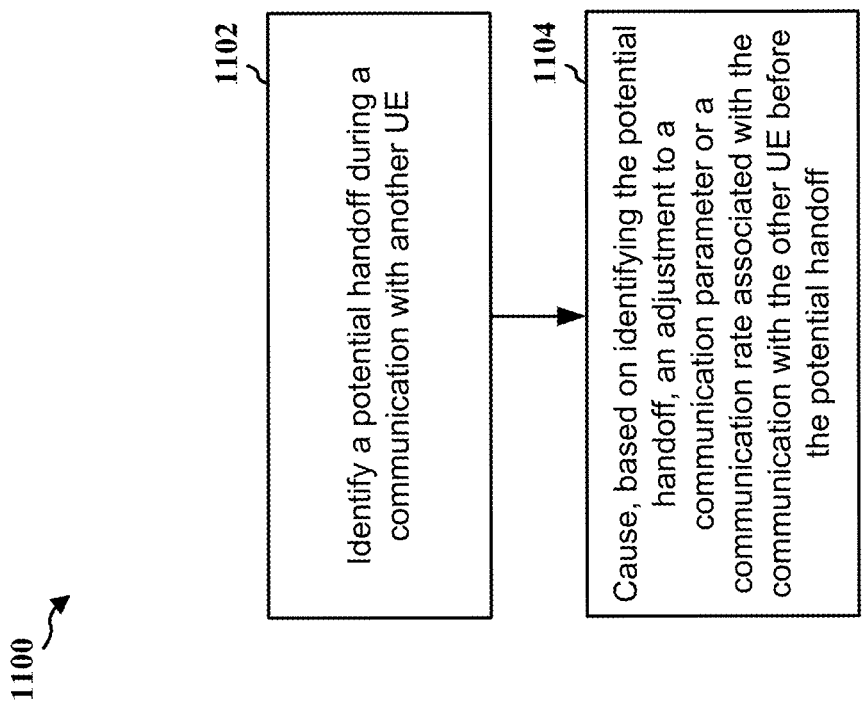
FIG. 11 is a flow chart of a method of wireless communication.

FIG. 11 is a flow chart of a method 1100 of wireless communication. The method 1100 may be performed by a UE (e.g., which may include one or more UE 102 of FIG. 1, the UE 206 of FIG. 2, the UE 650 of FIG. 6, the UEs 710, 730 of FIGS. 7A and/or 7B, etc., the apparatus 1402 of FIG. 14, the apparatus 1402' of FIG. 15, etc.).

At 1102, the UE may identify a potential handoff during a communication with another UE. For example, as described above in connection with FIGS. 7A and 7B, UE 710 may identify the potential handoff during the communication with UE 730. In some aspects, the communication may include a video telephony communication, a voice communication, or the like.

In some aspects, the UE may identify the potential handoff based on motion processor information. For example, UE 710 may determine, based on inertial information, global positioning system (GPS) information, or the like, that UE 710 is being moved away from source RAT 720 and/or toward target RAT 750. In this case, UE 710 may determine that a potential handoff is imminent based on UE 710 being moved in a direction from a cell associated with source RAT 720 toward a cell associated with target RAT 750.

In some aspects, the UE may identify the potential handoff based on signal strength information (e.g., Wi-Fi signal strength, LTE signal strength, GSM signal strength, or the like). For example, UE 710 may determine that a first signal strength associated with a first connection to source RAT 720 is decreasing and/or a second signal strength associated with a second connection to target RAT 750 is increasing. In some aspects, the signal strength information may be a Wi-Fi signal strength associated with source RAT 720 (e.g., when source RAT 720 is a Wi-Fi RAT), target RAT 750 (e.g., when target RAT 750 is a Wi-Fi RAT), or the like.

In some aspects, the UE may identify the potential handoff based on RAT signaling information. For example, UE 710 may receive a signal from source RAT 720, target RAT 750, or the like indicating that a handoff is to occur, that source RAT 720 is being disabled, that source RAT 720 is overloaded with connections, or another signal indicating a potential handoff for UE 710.

In some aspects, the UE may identify the potential handoff using machine learning. For example, UE 710 may generate a model, may refine the model based on known training data (e.g., data where a handoff occurred, data where a handoff did not occur, etc.), and may feed in inputs (e.g., motion processor information, signal strength information, RAT signaling information, uplink and/or downlink parameters, a de-jitter buffer state parameter, one or more environment parameters, etc.) to the model to make a determination whether a potential handoff will occur. In this case, UE 710 may continue to update the model based on identifying potential handoffs and determining whether the potential handoffs occurred.

In some aspects, UE 710 may be pre-configured to identify a potential handoff (e.g., before UE 710 is shipped to a consumer, connected to a network, or the like), such as based on a pre-performed machine learning algorithm (e.g., a machine learning based prediction algorithm). In some aspects, the UE may utilize information regarding the potential handoff (e.g., whether the potential handoff occurred) to improve identification of potential handoffs (e.g., using a machine learning technique, such as a machine learning algorithm). In some aspects, UE 710 may utilize information regarding media quality (e.g., a quality of a video communication, determined based on one or more objective measurements, one or more subjective measurements, or the like) before, during, and/or after a potential handoff to improve identification of the potential handoff (e.g., to select from a set of machine learning algorithms). In some aspects, UE 710 may utilize one or more parameters of a set of input parameters (e.g., a signal strength parameter, an uplink parameter, a downlink parameter, a de jitter buffer state parameter, an environment parameter, or the like) and a machine learning based prediction algorithm to identify the potential handoff.

In some aspects, the UE may identify the potential handoff based on monitoring one or more parameters. For example, UE 710 may utilize an input to monitor one or more parameters to determine the motion processor information, the signal strength information, the RAT signaling information, or the like. Further to the example, UE 710 may determine that a parameter, of the one or more parameters, satisfies a threshold, and may identify a potential handoff based on the parameter satisfying the threshold. In this case, UE 710 may compare the prediction against whether the potential handoff actually occurs to refine identification of future potential handoffs.

In some aspects, the UE may identify a type of the potential handoff. For example, UE 710 may determine that the handoff is an inter-RAT handoff, an intra-RAT handoff, or the like. In this case, UE 710 may utilize information regarding source RAT 720 (e.g., a Wi-Fi RAT, an LTE RAT, a wireless local area network (WLAN) RAT, etc.), target RAT 750 (e.g., a Wi-Fi RAT, an LTE RAT, etc.), or the like to determine the type of the potential handoff. In some aspects, source RAT 720 and/or target RAT 750 may be associated with another RAT, such as CDMA, GSM, or the like. In some aspects, the type of the handoff may be utilized to determine one or more parameters associated with adjusting a communication rate associated with the communication, such as a handoff duration, a data rate associated with the handoff, or the like.

In some aspects, the UE may monitor one or more measurement reports after identifying the potential handoff. For example UE 710 may monitor motion processor information, signal strength information, RAT signaling information, to determine whether the potential handoff is going to occur. When the potential handoff is triggered, is successful, completes, and a steady state is reached, UE 710 may provide information regarding the potential handoff completing, as described herein in connection with FIG. 12. When the potential handoff is not triggers and/or is not successful, UE 710 may provide information regarding the potential handoff not occurring (e.g., a cancellation message), as described herein in connection with FIG. 13.

In some aspects, the UE may utilize one or more of the above techniques to identify the potential handoff. For example, UE 710 may identify the potential handoff based on a combination of motion processor information and signal strength information; a combination of signal strength information and RAT signaling information; a combination of motion processor information, signal strength information, and RAT signaling information; or the like. In some aspects, the UE may apply one or more weights to one or more corresponding parameters when utilizing one or more of the above techniques. For example, UE 710 may apply a first weight to motion processor information and a second weight to signal strength information when identifying the potential handoff.

At 1104, the UE may cause, based on identifying the potential handoff, an adjustment to a communication parameter or a communication rate associated with the communication with the other UE before the potential handoff occurs. For example, UE 710 may cause the adjustment to the communication parameter or the communication rate associated with the communication. In some cases, the adjustment may occur while the handoff is ongoing. The communication rate (e.g., a video communication rate) may refer to an application layer data rate, such as an application layer output data rate associated with UE 710, an application layer input data rate associated with UE 730, or the like.

In some aspects, UE 710 may cause the adjustment to the communication parameter or the communication rate by causing UE 730 to adjust the communication parameter or the communication rate. For example, UE 710 may provide, to UE 730 and before the potential handoff occurs, information associated with the potential handoff. In some cases, the adjustment may occur while the handoff is ongoing. In some aspects, UE 710 may provide information including information associated with a communication delay, a jitter profile (e.g., an expected jitter during the handoff), a type of the potential handoff, an estimated communication rate for during the potential handoff, an audio to video synchronization delay associated with the handoff, an encoder buffer size, a decoder buffer size, an expected jitter value to influence a jitter buffer size, an expected handoff time, an expected handoff duration, an expected handoff completion time, a handoff type, or the like. For example, UE 710 may provide the information via message 760. In some examples, the communication parameter may be a jitter buffer size, a communication codec parameter, a codec frame per second rate, or a codec resolution.

In some aspects, UE 710 may determine the information based on one or more prior handoffs. For example, UE 710 may store particular information regarding one or more parameters that occurred before another handoff, during another handoff, and/or after another handoff, and may determine the information associated with the potential handoff based on the particular information.

In some aspects, UE 710 may provide the information to UE 730 via application layer signaling. For example, UE 730 may provide the information via an RTCP message, such as an application layer specific message. In some aspects, UE 730 may provide the information to UE 710 via one or more devices of an Internet Protocol multimedia subsystem (IMS) associated with UE 730 and/or UE 710.

In some aspects, UE 710 may cause the adjustment to the communication rate by adjusting the communication rate on UE 710. For example, UE 710 may adjust an uplink communication rate associated with the communication. In some aspects, UE 710 may utilize a rate adaptation algorithm to determine the adjustment to the communication rate. For example, UE 710 may utilize the rate adaptation algorithm to process one or more parameters, such as a handoff type, a handoff duration, an audio to video synchronization delay, a decoder buffer size, an expected jitter value to influence a jitter buffer size, an encoder buffer size, or the like, to determine the adjustment to the communication rate. In this case, UE 710 may adjust the communication rate based on the adjustment determined using the rate adaptation algorithm.

Although FIG. 11 shows example blocks of a method of wireless communication, in some aspects, the method may include additional blocks, fewer blocks, different blocks, or differently arranged blocks than those shown in FIG. 11. Additionally, or alternatively, two or more blocks shown in FIG. 11 may be performed in parallel.

Figure 12:
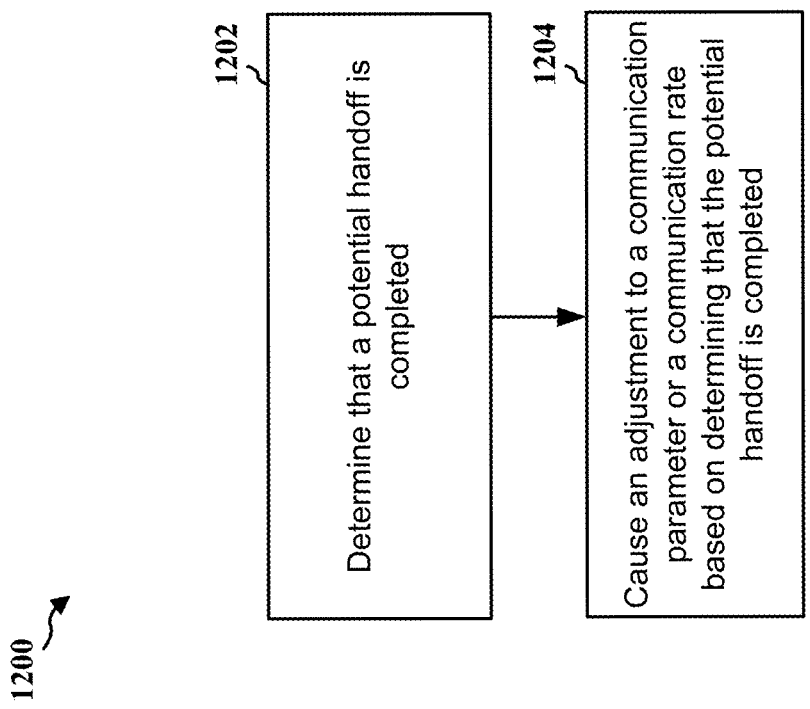
FIG. 12 is a flow chart of a method of wireless communication.

FIG. 12 is a flow chart of a method 1200 of wireless communication. The method 1200 may be performed by a UE (e.g., which may include one or more UE 102 of FIG. 1, the UE 206 of FIG. 2, the UE 650 of FIG. 6, the UEs 710, 730 of FIGS. 7A and/or 7B, etc., the apparatus 1402 of FIG. 14, the apparatus 1402' of FIG. 15, etc.).

At 1202, the UE may determine that a potential handoff is completed. For example, as described above in connection with FIGS. 7A and 7B and FIG. 11, after identifying the potential handoff during a communication with another UE and causing an adjustment to a communication parameter or a communication rate associated with the communication before the potential handoff, UE 710 may determine that the potential handoff is completed. In some aspects, the UE may store information associated with the potential handoff in a data structure after the potential handoff is completed. For example, the UE may store a value of a parameter during the potential handoff for utilization in identifying another potential handoff. In some aspects, the information associated with the potential handoff may include a handoff execution time associated with the potential handoff, a geographic location associated with the potential handoff, a type associated with the potential handoff, or the like.

At 1204, the UE may cause an adjustment to a communication parameter or a communication rate based on determining that the potential handoff is completed. For example, UE 710 may cause the adjustment to the communication parameter or the communication rate based on determining that the potential handoff is completed. In some aspects, the UE may adjust the communication parameter or the communication rate, such as by adjusting an uplink communication rate associated with the communication. In some aspects, UE 710 may cause UE 730 to adjust the communication parameter or the communication rate by indicating, to UE 730, that the potential handoff is completed. For example, UE 710 may transmit message 785 to UE 730 to cause UE 730 to adjust the communication parameter or the communication rate. In this case, message 785 may include an uplink rate estimate (e.g., an estimated uplink rate while utilizing target RAT 750 for network connectivity), a downlink rate estimate (e.g., an estimated downlink rate while utilizing target RAT 750 for network connectivity), or the like associated with target RAT 750 to which UE 710 is connected. In some aspects, UE 710 may provide information associated with target RAT 750 to UE 730, such as a type of RAT of target RAT 750, to facilitate UE 730 determining an adjustment to the communication rate (e.g., based on the type of RAT of target RAT 750).

In some aspects, the UE may provide information associated with resetting the communication parameter or a rate adaptation algorithm to cause the adjustment to the communication rate. For example, when UE 710 causes UE 730 to disable adjustments to the communication rate based on input to a rate adaptation algorithm, UE 710 may provide information associated with causing UE 730 to enable adjustments to the communication rate based on input to the rate adaptation algorithm.

Although FIG. 12 shows example blocks of a method of wireless communication, in some aspects, the method may include additional blocks, fewer blocks, different blocks, or differently arranged blocks than those shown in FIG. 12. Additionally, or alternatively, two or more blocks shown in FIG. 12 may be performed in parallel.

Figure 13:
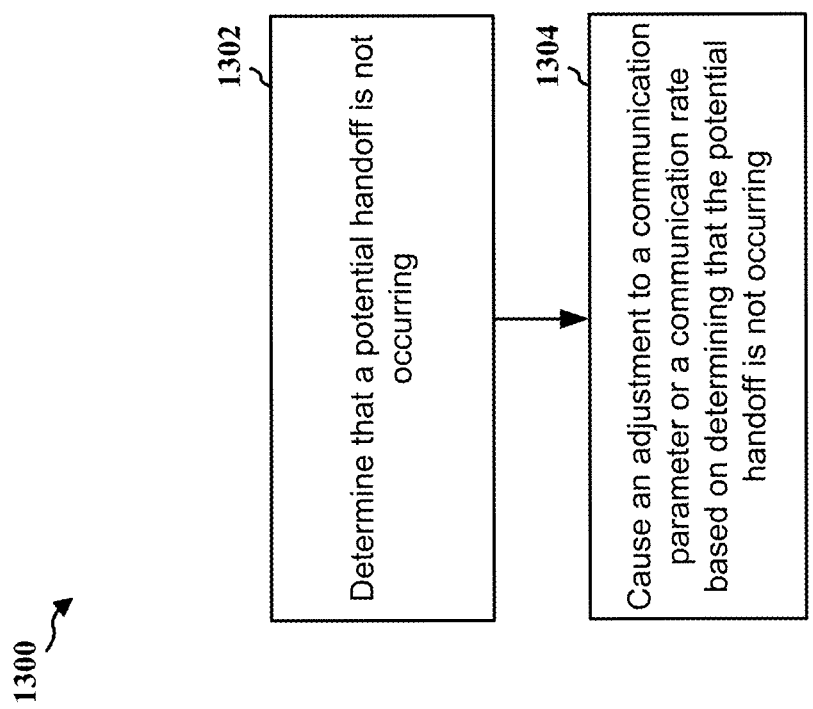
FIG. 13 is a flow chart of a method of wireless communication.

FIG. 13 is a flow chart of a method 1300 of wireless communication. The method 1300 may be performed by a UE (e.g., which may include one or more UE 102 of FIG. 1, the UE 206 of FIG. 2, the UE 650 of FIG. 6, the UEs 710, 730 of FIGS. 7A and/or 7B, etc., the apparatus 1402 of FIG. 14, the apparatus 1402' of FIG. 15, etc.).

At 1302, the UE may determine that a potential handoff is not occurring. For example, as described above in connection with FIGS. 7A and 7B and FIG. 11, after identifying the potential handoff during a communication with another UE and causing an adjustment to a communication parameter or a communication rate associated with the communication before the potential handoff occurs, UE 710 may determine that the potential handoff is not occurring. In some aspects, the UE may determine that the potential handoff is not occurring based on operating a timer. For example, UE 710 may operate a timer and may determine that a threshold period of time has elapsed. In this case, UE 710 may determine that the potential handoff is not occurring based on determining that the threshold period of time has elapsed.

In some aspects, UE 710 may determine that the potential handoff is not occurring based on motion processor information, signal strength information, RAT signaling information, or the like. For example, UE 710 may determine that a signal strength, which satisfied a threshold when UE 710 identified the potential handoff, no longer satisfies the threshold.

At 1304, the UE may cause an adjustment to a communication parameter or a communication rate based on determining that the potential handoff is not occurring. For example, UE 710 may cause the adjustment to the communication parameter or the communication rate, as described above in connection with FIG. 12, by adjusting the communication parameter or the communication rate, causing UE 730 to adjust the communication parameter or the communication rate, or the like. In this case, UE 710 may provide, to UE 730, information indicating that the potential handoff is not occurring to cause UE 730 to adjust the communication parameter or the communication rate, may adjust the communication parameter or the communication rate based on a rate adaptation algorithm, or the like. In some examples, the communication parameter may be a jitter buffer size, a communication codec parameter, a codec frame per second rate, or a codec resolution.

Although FIG. 13 shows example blocks of a method of wireless communication, in some aspects, the method may include additional blocks, fewer blocks, different blocks, or differently arranged blocks than those shown in FIG. 13. Additionally, or alternatively, two or more blocks shown in FIG. 13 may be performed in parallel.

Figure 14:
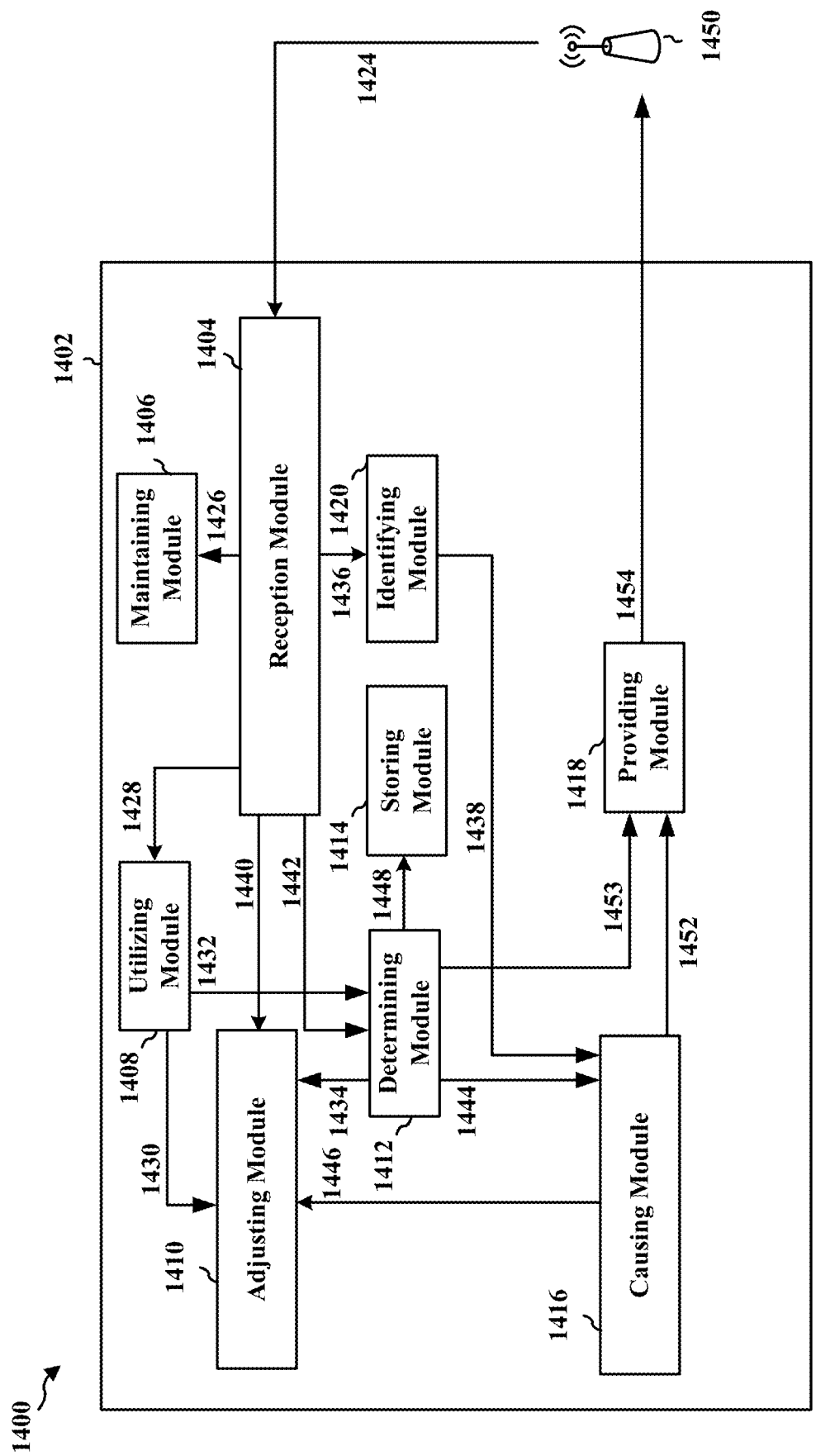
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be a UE. As shown, apparatus 1402 may include a reception module 1404, a maintaining module 1406, a utilizing module 1408, an adjusting module 1410, a determining module 1412, a storing module 1414, a causing module 1416, a providing module 1418, and an identifying module 1420.

The reception module 1404 may receive data 1424 as input from eNB 1450 (e.g., which may include one or more of the eNBs 106, 108 of FIG. 1, the eNBs 204, 208 of FIG. 2, the eNB 610 of FIG. 6, source RAT 720, Target RAT 750, eNB 740 of FIGS. 7A and/or 7B, etc.). The reception module 1404 may receive information indicating a potential handoff (e.g., an estimated communication rate, such as a video telephony rate, or the like, an application layer data rate, such as an application layer output data rate, an application layer input data rate, or the like, an audio to video synchronization delay, an encoder buffer size, a decoder buffer size, an expected jitter value to influence a jitter buffer size, a predicted handoff time, a predicted handoff duration, a predicted handoff type, such as a potential inter-RAT handoff, a potential intra-RAT handoff, or the like) during a communication (e.g., a video communication). The reception module 1404 may receive information indicating that the potential handoff is completed, information indicating that the potential handoff is not occurring, information indicating a particular parameter (e.g., jitter, packet delay, signaling information, etc.), a set of parameters associated with using a machine learning based prediction algorithm (e.g., a signal strength parameter, an uplink parameter, a downlink parameter, a de jitter buffer state parameter, an environment parameter, etc.), or the like. The reception module 1404 may receive data 1424 via an RTCP message, such as an application layer specific message provided via the RTCP message. As shown, reception module 1404 may provide data 1426 (e.g., which may be processed by reception module 1404) as output to the maintaining module 1406 (e.g., as data 1426), to the utilizing module 1408 (e.g., as data 1428), to the adjusting module 1410 (e.g., as data 1440), to the determining module 1412 (e.g., as data 1442), and/or to the identifying module 1420 (e.g., as data 1436).

The maintaining module 1406 may receive data 1426 from the reception module 1404. Based on data 1426, the maintaining module 1406 may maintain a communication rate associated with a communication (e.g., regardless of an increased quantity of jitter, packet delay, or the like relative to prior to the potential handoff occurring).

The utilizing module 1408 may receive data 1428 from the reception module 1404. Based on data 1428, the utilizing module 1408 may utilize a rate adaptation algorithm to determine an adjustment to a communication parameter or a communication rate (e.g., that may be performed by the adjusting module 1410). As shown, the utilizing module

1408 may provide data 1430 to the adjusting module 1410 and/or may provide data 1432 to the determining module 1412.

The adjusting module 1410 may receive data 1430 from the utilizing module 1408, data 1434 from the determining module 1412, data 1440 from the reception module 1404, and/or data 1446 from the causing module 1416. Based on data 1430, the adjusting module 1410 may adjust a communication parameter or a communication rate (e.g., based on utilizing the rate adaptation algorithm to determine an adjustment to the communication rate). Based on data 1434, the adjusting module 1410 may adjust a communication parameter or a communication rate (e.g., based on determining particular information associated with a packet delay, a jitter profile, or the like, based on determining that an expected value of a parameter is within a threshold, satisfies a threshold, or the like, based on determining an audio to video synchronization delay, based on determining an estimated uplink or downlink rate, or the like). In some examples, the communication parameter may be a jitter buffer size, a communication codec parameter, a codec frame per second rate, or a codec resolution. Based on data 1440, the adjusting module 1410 may adjust (e.g., based on receiving information indicating a potential handoff) a communication parameter or a communication rate before a potential handoff occurs, the communication parameter or the communication rate based on receiving information indicating that the potential handoff is completed, the communication parameter or the communication rate based on receiving the information indicating that the potential handoff is not occurring, the communication parameter or the communication rate before an estimated time (e.g., of the potential handoff occurring), or the like. Based on data 1446, the adjusting module 1410 may adjust a communication parameter or a communication rate after a potential handoff is completed to cause an adjustment to the communication parameter or the communication rate or the like. The communication rate, adjusted by the adjusting module 1410, may include a video telephony encoder rate.

The determining module 1412 may receive data 1432 from the utilizing module 1408 and/or data 1442 from the reception module 1404. Based on data 1432, the determining module 1412 may determine an adjustment to a communication parameter or a communication rate (e.g., based on information provided by a rate adaptation algorithm, based on a rate adaptation algorithm, etc.). Based on data 1442, the determining module 1412 may determine an audio to video synchronization delay (e.g., based on receiving information indicating a potential handoff and to cause an adjustment to a communication parameter or a communication rate), a set of input parameters (e.g., associated with using a machine learning prediction algorithm), an estimated uplink or downlink rate associated with a communication, or the like. The determining module 1412 may determine particular information associated with a packet delay, a jitter, or the like (e.g., based on information stored in a data structure storing handoff information). The determining module 1412 may determine an expected value of a parameter associated with a communication (e.g., expected during a potential handoff), and may determine that the expected value of the parameter is within a threshold quantity of a particular value of the parameter, satisfies a threshold associated with the parameter, or the like. The determining module 1412 may determine information associated with a potential handoff based on information associated with one or more other (prior) handoffs (e.g., stored information, observed information, or the like associated with the one or more other handoffs). The determining module 1412 may determine that a potential handoff is completed, that the potential handoff is not occurring (e.g., based on a threshold period of time elapsing), a particular type associated with the potential handoff, or the like. As shown, the determining module 1412 may provide data 1434 to adjusting module 1410, data 1444 to the causing module 1416, and/or data 1448 to the storing module 1414.

The storing module 1414 may receive data 1448 from the determining module 1412. Based on data 1448, the storing module 1414 may store (e.g., in a data structure) information (e.g., a handoff execution time, a geographic location, a handoff type, etc.) associated with a potential handoff after the potential handoff is completed.

The causing module 1416 may receive data 1438 from the identifying module 1420 and/or data 1444 from the determining module 1412. Based on data 1438, the causing module 1416 may cause (e.g., based on identifying a potential handoff) an adjustment to a communication parameter or a communication rate associated with a communication before the potential handoff occurs. In some cases, the adjustment may occur while the handoff is ongoing. Based on data 1444, the causing module may cause an adjustment to a communication parameter or a communication rate (e.g., based on determining that a potential handoff is complete, is not occurring, or the like). As shown, the causing module 1416 may provide data 1446 to the adjusting module 1410 and/or data 1452 to the providing module 1418.

The providing module 1418 may receive data 1453 from the determining module 1412 and/or data 1452 from the causing module 1416. Based on data 1453, the providing module 1418 may provide information associated with resetting a rate adaptation algorithm when the potential handoff is completed. Based on data 1452, the providing module 1418 may provide information associated with a potential handoff (e.g., an expected handoff time, an expected handoff duration, an expected handoff completion time, a handoff type, an estimated communication rate, an audio to video synchronization delay, an encoder buffer size, a decoder buffer size, an expected jitter value to influence a jitter buffer size, or the like), a completed handoff (e.g., information associated with a target RAT, such as a target RAT uplink rate estimate, a target RAT downlink rate estimate, etc.), a potential handoff that is not occurring, or the like to another UE to cause the other UE to adjust a communication parameter or a communication rate associated with a communication. Providing module 1418 may provide information associated with a potential handoff before the potential handoff (e.g., to eNB 1450 for transmission to a UE). As shown, the providing module 1418 may provide data 1454 to eNB 1450 (e.g., using application layer signaling, via an RTCP message, such as an application layer specific message, or the like). The providing module 1418 may provide the data 1454 to another UE via eNB 1450, a device associated with an IMS, or the like.

The identifying module 1420 may receive data 1436 from the reception module 1404. Based on data 1436, the identifying module 1420 may identify a potential handoff during a communication (e.g., based on motion processor information, signal strength information, such as wireless local area network (WLAN) signal strength information, Wi-Fi signal strength information, or the like, RAT signaling information, etc.). The identifying module 1420 may identify the potential handoff based on one or more machine learning techniques (e.g., a machine learning based prediction algorithm) associated with identifying the potential handoff, matching a parameter to a threshold parameter value, or the like. As shown, the identifying module 1420 may provide data 1438 to causing module 1416.

The apparatus may include additional modules that perform each of the blocks of the algorithm in the aforementioned flow charts of FIGS. 8, 9, 10, 11, 12, and/or 13. As such, each block in the aforementioned flow charts of FIGS. 8, 9, 10, 11, 12, and/or 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
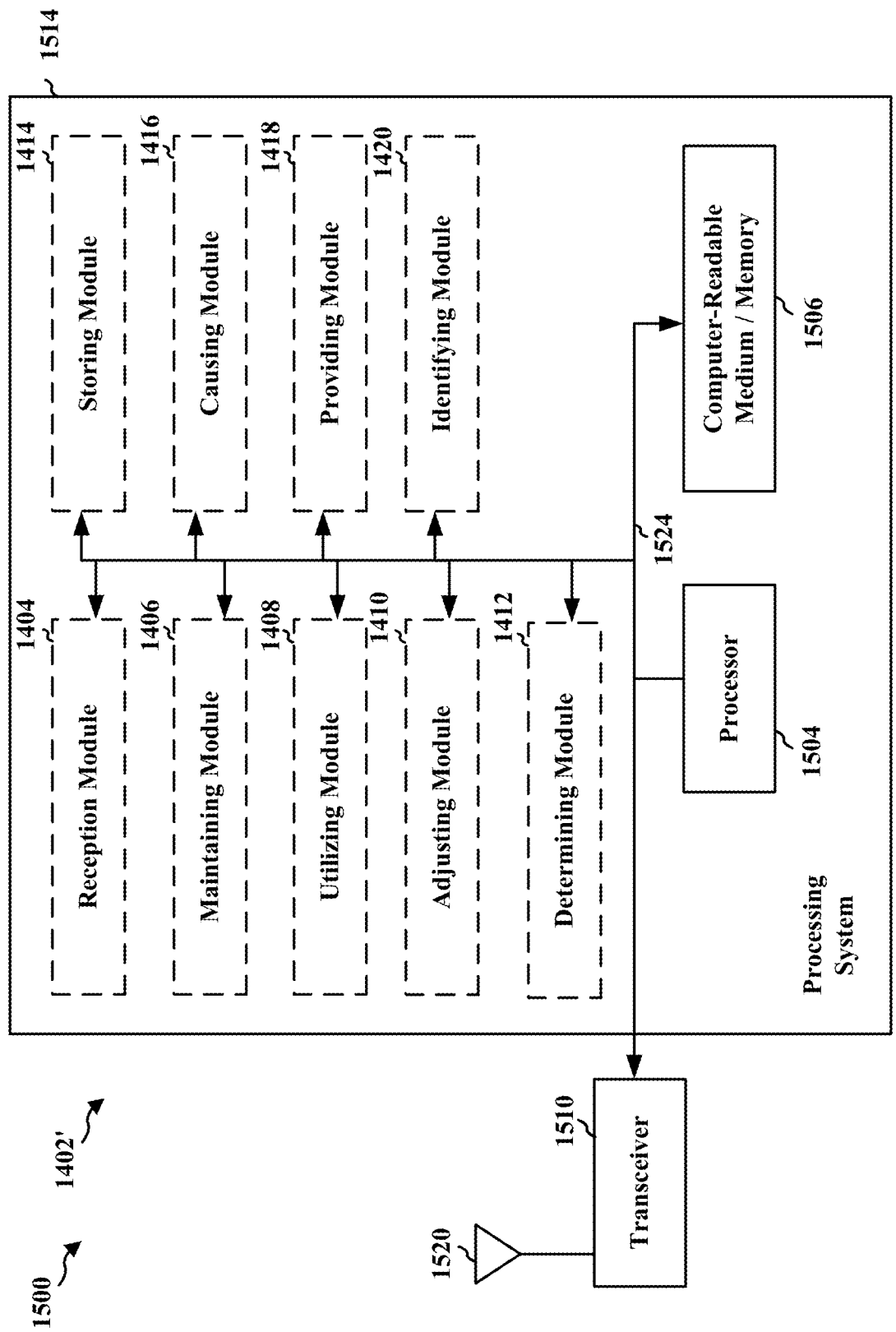
FIG. 15 is a diagram illustrating an example of a hardware implementation for an apparatus employing a processing system.

FIG. 15 is a diagram illustrating an example 1500 of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, 1410, 1412, 1414, 1416, 1418, and 1420, and the computer-readable medium/memory 1506. The bus 1524 may also link various other circuits such as timing sources, peripherals, voltage regulators, and power management circuits, which are well known in the art.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception module 1404. In addition, the transceiver 1510 receives information from the processing system 1514, specifically the providing module 1418, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system further includes at least one of the modules 1404, 1406, 1408, 1410, 1412, 1414, 1416, 1418, and 1420. The modules may be software modules running in the processor 1504, resident/stored in the computer readable medium/memory 1506, one or more hardware modules coupled to the processor 1504, or some combination thereof. The processing system 1514 may be a component of the UE 650 and may include the memory 660 and/or at least one of the TX processor 668, the RX processor 656, and the controller/processor 659.

In one configuration, the apparatus 1402/1402' for wireless communication includes means for receiving, by a user equipment (UE), information indicating a potential handoff for another UE in communication with the UE, means for adjusting, by the UE and based on the information indicating the potential handoff, a communication parameter or a communication rate associated with the communication before the potential handoff occurs, means for determining, based on information stored in a data structure storing handoff information, particular information associated with at least one of a communication delay or a jitter profile, means for adjusting the communication parameter or the communication rate based on the particular information, means for determining an expected value of a parameter associated with the communication, means for determining that the expected value of the parameter is within a threshold of a particular value of the parameter, means for adjusting the communication parameter or the communication rate based on determining that the expected value of the parameter is within the threshold of the particular value of the parameter, means for determining an expected value of a parameter associated with the communication, means for determining that the expected value of the parameter satisfies a threshold of a particular value of the parameter, means for adjusting the communication parameter or the communication rate based on determining that the expected value of the parameter satisfies the threshold of the particular value of the parameter, means for adjusting a video telephony encoder rate, means for utilizing a rate adaptation algorithm to determine an adjustment to the communication parameter or the communication rate based on receiving the information indicating the potential handoff, means for adjusting the communication parameter or the communication rate based on determining the adjustment to the communication parameter or the communication rate, means for determining an audio to video synchronization delay based on receiving the information indicating the potential handoff, means for adjusting the communication parameter or the communication rate based on the audio to video synchronization delay, means for determining an estimated uplink or downlink rate associated with the communication based on the information indicating the potential handoff, means for adjusting the communication parameter or the communication rate, after the potential handoff, based on the estimated uplink or downlink rate, means for receiving information indicating that the potential handoff is completed, means for adjusting the communication parameter or the communication rate based on receiving the information indicating that the potential handoff is completed, means for receiving information indicating that the potential handoff is not occurring, means for adjusting the communication parameter or the communication rate based on receiving the information indicating that the potential handoff is not occurring, means for receiving information indicating an amount of jitter associated with the communication, means for maintaining the communication parameter or the communication rate after receiving the information indicating the amount of jitter, means for receiving information indicating an amount of packet delay associated with the communication, means for maintaining the communication parameter or the communication rate after receiving the information indicating the amount of packet delay, means for receiving information indicating an estimated time of the potential handoff occurring, and/or means for adjusting the communication parameter or the communication rate before the estimated time based on receiving the information indicating the estimated time of the potential handoff occurring.

In another configuration, the apparatus 1402/1402' for wireless communication includes means for identifying, by a user equipment (UE), a potential handoff during a communication with another UE, means for causing, by the UE and based on identifying the potential handoff, an adjustment to a communication parameter or a communication rate associated with the communication before the potential handoff occurs, means for providing, to the other UE, information associated with the potential handoff before the potential handoff, means for providing the information, associated with the potential handoff, via application layer signaling, means for providing the information, associated with the potential handoff, via a real-time transport protocol (RTP) control protocol (RTCP) message, means for providing the information, associated with the potential handoff, via a particular communication to a device associated with an Internet Protocol (IP) multimedia subsystem associated with providing connectivity to the UE and the other UE, means for utilizing a rate adaptation algorithm to determine the adjustment to the communication parameter or the communication rate, means for identifying the potential handoff based on at least one of motion processor information, signal strength information, or radio access technology (RAT) information, means for providing, before the potential handoff occurs, information associated with the potential handoff to the other UE to cause the other UE to adjust a communication parameter or a communication rate associated with the communication, means for determining the information associated with the potential handoff based on information associated with one or more other handoffs, means for determining that the potential handoff is completed, means for determining that the potential handoff is a particular type of a handoff, means for providing information associated with resetting a communication parameter or a communication rate algorithm based on determining that the potential handoff is completed and based on the particular type of a handoff, means for determining that the potential handoff is completed, means for storing information associated with the potential handoff in a data structure after the potential handoff is completed, means for determining that the potential handoff is completed, means for causing another adjustment to the communication parameter or the communication rate based on determining that the potential handoff is completed, means for adjusting the communication parameter or the communication rate after the potential handoff is completed, means for providing, to the other UE to cause the other UE to adjust the communication parameter or the communication rate after the potential handoff is completed, information identifying at least one of a target radio access technology (RAT) uplink rate estimate or a target RAT downlink rate estimate, means for providing, to the other UE, information indicating that the potential handoff is completed, means for providing information associated with a target radio access technology (RAT), means for determining that the potential handoff is not occurring, means for causing another adjustment to the communication parameter or the communication rate based on determining that the potential handoff is not occurring, means for determining that a threshold period of time associated with the potential handoff has elapsed, means for determining that the potential handoff is not occurring based on determining that the threshold period of time associated with the potential handoff has elapsed, means for providing, to the other UE, information indicating that the potential handoff is not occurring, means for identifying the potential handoff using a machine learning based prediction algorithm, means for monitoring a set of input parameters, means for identifying the potential handoff based on the set of input parameters and the machine learning based prediction algorithm.

The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for." Further, the phrase "based on" is intended to mean "based, at least in part, on" unless explicitly stated otherwise.

What is claimed is:

1. A method for wireless communication at a first user equipment (UE), comprising:

receiving, from a second UE in communication with the first UE, information in a message indicating a potential handoff of the second UE is to occur, the potential handoff being associated with a connection between the second UE and a node different from the first UE, and the message being at least one of a real-time transport protocol (RTP) control protocol (RTCP) message or a generic application layer signaling message;

determining a value of a communication parameter that is expected during the potential handoff;

determining the value of the communication parameter is within a threshold value for the communication parameter; and adjusting, by the first UE and based on the information indicating the potential handoff, the communication parameter or a communication rate associated with a communication between the first UE and the second UE before a time when the potential handoff is to occur, wherein adjusting the communication parameter or the communication rate is based on determining that the value of the communication parameter is within the threshold value for the communication parameter.

2. The method of claim 1,
wherein adjusting the communication parameter or the communication rate further comprises:
determining, based on information stored in a data structure storing handoff information or the communication parameter, particular information associated with at least one of a communication delay or a jitter profile.

3. The method of claim 1, further comprising:
utilizing a rate adaptation algorithm to determine an adjustment to the communication rate based on receiving the information indicating the potential handoff; and
wherein adjusting the communication rate further comprises:
adjusting a video telephony encoder rate based on determining the adjustment to the communication rate.

4. The method of claim 1, wherein the information indicating the potential handoff includes at least one of:
an estimated communication rate,
an audio to video synchronization delay,
an encoder buffer size,
a decoder buffer size,
an expected jitter value to influence a jitter buffer size,
a predicted handoff time,
a predicted handoff duration, or
a predicted handoff type.

5. The method of claim 1, wherein the communication parameter includes at least one of:
a jitter buffer size,
a communication codec parameter,
a codec frame per second rate, or
a codec resolution.

6. The method of claim 1, further comprising:
determining an estimated uplink or downlink rate associated with the communication based on the information indicating the potential handoff; and
adjusting the communication parameter or the communication rate, after receiving the information indicating the potential handoff, based on the estimated uplink or downlink rate.

7. The method of claim 1, further comprising:
receiving information indicating that the potential handoff is not occurring; and
adjusting the communication parameter or the communication rate based on receiving the information indicating that the potential handoff is not occurring.

8. The method of claim 1, further comprising:
receiving information indicating that a handoff corresponding to the potential handoff is completed;
adjusting the communication parameter or the communication rate based on receiving the information indicating that the handoff is completed; and wherein the information indicating that the handoff corresponding to the potential handoff is completed is received via at least one of an RTCP message or a generic application layer signaling message.

9. The method of claim 1, further comprising:
receiving information indicating an amount of jitter associated with the communication, wherein the amount of jitter is associated with the second UE undergoing the potential handoff, and wherein the amount of jitter is greater than an amount of jitter associated with the communication prior to the second UE undergoing the potential handoff; or
receiving information indicating an amount of packet delay associated with the communication, wherein the amount of packet delay is associated with the second UE undergoing the potential handoff, and wherein the amount of packet delay is greater than an amount of packet delay associated with the communication prior to the second UE undergoing the potential handoff; and
maintaining the communication rate after receiving the information indicating the amount of jitter or the information indicating the amount of packet delay.

10. The method of claim 1, wherein the communication is a video communication, and wherein the communication rate is a video telephony rate.

11. The method of claim 1, wherein the potential handoff is a potential inter-radio access technology (inter-RAT) handoff.

12. The method of claim 1, further comprising:
receiving information indicating an estimated time when the potential handoff is to occur; and
wherein adjusting the communication parameter or the communication rate associated with the communication between the first UE and the second UE before the time when the potential handoff is to occur comprises:
adjusting the communication rate before the estimated time when the potential handoff is to occur.

13. A device for wireless communication, comprising:
one or more processors; and
memory coupled to the one or more processors, the memory comprising instructions that, when executed by the one or more processors, cause the device to:
receive, from a second device in communication with the device, information in a message indicating a potential handoff of the second device is to occur, the potential handoff being associated with a connection between the second device and a node different from the device, and the message being at least one of a real-time transport protocol (RTP) control protocol (RTCP) message or a generic application layer signaling message;
determine a value of a communication parameter that is expected during the potential handoff;
determine the value of the communication parameter is within a threshold value for the communication parameter; and
adjust, based on the information indicating the potential handoff, the communication parameter or a communication rate associated with a communication between the device and the second device before a time when the potential handoff is to occur, wherein adjusting the communication parameter or the communication rate is based on determining that the value of the communication parameter is within the threshold value for the communication parameter.

14. The device of claim 13, wherein:
the instructions to cause the device to adjust the communication parameter or the communication rate further cause the device to:
determine, based on information stored in a data structure storing handoff information or the communication parameter, particular information associated with at least one of a communication delay or a jitter profile.

15. The device of claim 13, wherein:
the instructions, when executed by the one or more processors, further cause the device to utilize a rate adaptation algorithm to determine an adjustment to the communication rate based on receiving the information indicating the potential handoff; and
the instructions to cause the device to adjust the communication parameter or the communication rate further cause the device to adjust a video telephony encoder rate based on determining the adjustment to the communication rate.

16. The device of claim 13, wherein the information indicating the potential handoff includes at least one of:
an estimated communication rate,
an audio to video synchronization delay,
an encoder buffer size,
a decoder buffer size,
an expected jitter value to influence a jitter buffer size,
a predicted handoff time,
a predicted handoff duration, or
a predicted handoff type.

17. The device of claim 13, wherein the communication parameter includes at least one of:
a jitter buffer size,
a communication codec parameter,
a codec frame per second rate, or
a codec resolution.

18. The device of claim 13, wherein the instructions, when executed by the one or more processors, further cause the device to:
determine an estimated uplink or downlink rate associated with the communication based on the information indicating the potential handoff; and
adjust the communication parameter or the communication rate, after receiving the information indicating the potential handoff, based on the estimated uplink or downlink rate.

19. The device of claim 13, wherein the instructions, when executed by the one or more processors, further cause the device to:
receive information indicating that the potential handoff is not occurring; and
adjust the communication parameter or the communication rate based on receiving the information indicating that the potential handoff is not occurring.

20. The device of claim 13, wherein the instructions, when executed by the one or more processors, further cause the device to:
receive information indicating that a handoff corresponding to the potential handoff is completed;
adjust the communication parameter or the communication rate based on receiving the information indicating that the handoff is completed; and
wherein the information indicating that the handoff corresponding to the potential handoff is completed is received via at least one of an RTCP message or a generic application layer signaling message.

21. The device of claim 13, wherein the instructions, when executed by the one or more processors, further cause the device to:
receive information indicating an amount of jitter associated with the communication, wherein the amount of jitter is associated with the second device undergoing the potential handoff, and wherein the amount of jitter is greater than an amount of jitter associated with the communication prior to the second device undergoing the potential handoff; or
receive information indicating an amount of packet delay associated with the communication, wherein the amount of packet delay is associated with the second device undergoing the potential handoff, and wherein the amount of packet delay is greater than an amount of packet delay associated with the communication prior to the second device undergoing the potential handoff; and
maintain the communication rate after receiving the information indicating the amount of jitter or the information indicating the amount of packet delay.

22. The device of claim 13, wherein the communication is a video communication, and wherein the communication rate is a video telephony rate.

23. The device of claim 13, wherein the potential handoff is a potential inter-radio access technology (inter-RAT) handoff.

24. The device of claim 13, wherein:
the instructions, when executed by the one or more processors, further cause the device to receive information indicating an estimated time when the potential handoff is to occur; and
the instructions to cause the device to adjust the communication parameter or the communication rate associated with the communication between the device and the second device before the time when the potential handoff is to occur cause the device to adjust the communication rate before the estimated time when the potential handoff is to occur.

25. A device for wireless communication, comprising:
means for receiving, from a user equipment (UE) in communication with the device, information indicating a potential handoff of the UE is to occur, the potential handoff being associated with a connection between the UE and a node different from the device, and the message being at least one of a real-time transport protocol (RTP) control protocol (RTCP) message or a generic application layer signaling message;
means for determining a value of a communication parameter that is expected during the potential handoff;
means for determining the value of the communication parameter is within a threshold value for the communication parameter; and
means for adjusting, based on the information indicating the potential handoff, the communication parameter or a communication rate associated with a communication between the device and the UE before a time when the potential handoff is to occur, wherein adjusting the communication parameter or the communication rate is based on determining that the value of the communication parameter is within the threshold value for the communication parameter.

26. The device of claim 25,
wherein means for adjusting the communication parameter or the communication rate further comprises:
means for determining, based on information stored in a data structure storing handoff information or the communication parameter, particular information associated with at least one of a communication delay or a jitter profile.

27. The device of claim 25, further comprising:
means for utilizing a rate adaptation algorithm to determine an adjustment to the communication rate based on receiving the information indicating the potential handoff; and
wherein means for adjusting the communication rate further comprises:
means for adjusting a video telephony encoder rate based on determining the adjustment to the communication rate.

28. The device of claim 25, wherein the information indicating the potential handoff includes at least one of:
an estimated communication rate,
an audio to video synchronization delay,
an encoder buffer size,
a decoder buffer size,
an expected jitter value to influence a jitter buffer size,
a predicted handoff time,
a predicted handoff duration, or
a predicted handoff type.

29. The device of claim 25, wherein the communication parameter includes at least one of:
a jitter buffer size,
a communication codec parameter,
a codec frame per second rate, or
a codec resolution.

30. A non-transitory computer-readable medium storing instructions for wireless communication, the instructions comprising:
one or more instructions that, when executed by one or more processors of a first user equipment (UE), cause the one or more processors to:
receive, from a second UE in communication with the first UE, information indicating a potential handoff of the second UE is to occur, the potential handoff being associated with a connection between the second UE and a node different from the first UE, and the message being at least one of a real-time transport protocol (RTP) control protocol (RTCP) message or a generic application layer signaling message;
determine a value of a communication parameter that is expected during the potential handoff;
determine the value of the communication parameter is within a threshold value for the communication parameter; and
adjust, by the first UE and based on the information indicating the potential handoff, the communication parameter or a communication rate associated with a communication between the first UE and the second UE before a time when the potential handoff is to occur, wherein adjusting the communication parameter or the communication rate is based on determining that the value of the communication parameter is within the threshold value for the communication parameter.

* * * * *